United States Patent
Dong

(10) Patent No.: US 8,361,920 B2
(45) Date of Patent: Jan. 29, 2013

(54) METHODS AND COMPOSITIONS FOR REMOVAL OF ARSENIC AND HEAVY METALS FROM WATER

(75) Inventor: Liangjie Dong, Honolulu, HI (US)

(73) Assignee: MicroNose Technologies, LLC, Fremont, CA (US)

( * ) Notice: Subject to any disclaimer, the term of this patent is extended or adjusted under 35 U.S.C. 154(b) by 535 days.

(21) Appl. No.: 12/159,604

(22) PCT Filed: Dec. 29, 2006

(86) PCT No.: PCT/US2006/049561
§ 371 (c)(1),
(2), (4) Date: Jun. 27, 2008

(87) PCT Pub. No.: WO2007/079215
PCT Pub. Date: Jul. 12, 2007

(65) Prior Publication Data
US 2008/0311288 A1    Dec. 18, 2008

Related U.S. Application Data

(60) Provisional application No. 60/754,838, filed on Dec. 29, 2005.

(51) Int. Cl.
*B01J 29/04*    (2006.01)
(52) U.S. Cl. ............... 502/62; 502/74; 502/80
(58) Field of Classification Search .......... 502/62, 502/74, 80
See application file for complete search history.

(56) References Cited

U.S. PATENT DOCUMENTS

| | | | | |
|---|---|---|---|---|
| 3,086,880 A * | 4/1963 | Compton | .............. | 428/141 |
| 4,279,849 A * | 7/1981 | Ogawa et al. | .............. | 264/631 |
| 5,198,592 A * | 3/1993 | van Beijnum et al. | ........ | 568/885 |
| 6,261,986 B1 * | 7/2001 | Bowman et al. | .............. | 502/62 |
| 7,476,311 B2 * | 1/2009 | Litz et al. | .............. | 210/88 |
| 7,611,637 B2 * | 11/2009 | Zhang | .............. | 210/749 |
| 2002/0103081 A1 | 8/2002 | Wolff | | |
| 2003/0178357 A1 | 9/2003 | Wolff et al. | | |
| 2006/0049091 A1 * | 3/2006 | Cheetham et al. | .............. | 210/283 |
| 2008/0311288 A1 | 12/2008 | Dong | | |

FOREIGN PATENT DOCUMENTS

| | | |
|---|---|---|
| AU | 2006332710 A1 | 7/2007 |
| CA | 2 635 584 A1 | 7/2007 |
| CN | 101405223 A | 4/2009 |
| EP | 0 831 076 A | 3/1998 |
| EP | 1 968 897 A2 | 9/2008 |
| MX | 2008008537 A | 1/2009 |
| WO | WO 2005/037430 A | 4/2005 |
| WO | WO 2007/079215 A2 | 7/2007 |
| WO | WO 2007/079215 A3 | 7/2007 |

OTHER PUBLICATIONS

Komlev, et al., "Porous Ceramic Granules of Hydroxyapatite," Refractories and Industrial Ceramics, vol. 42, No. 5—6, 2001, p. 195-197.*

Morrissey, et. al., "Influence of ferrous iron incorporation on the structure of hydroxyapatite," Journal of Materials Science: Materials in Medicine 2005, 16:387-392.*

(Continued)

*Primary Examiner* — Chester Barry
(74) *Attorney, Agent, or Firm* — Davis Wright Tremaine LLP; Sheila R. Gibson; Katherine Falkenhagen

(57) ABSTRACT

The present invention relates to methods and compositions for removal of arsenic and heavy metals from water.

20 Claims, 3 Drawing Sheets

Arsenic Removal percentage at Different Flowrates

OTHER PUBLICATIONS

ISA/EPO, "International Search Report," corresponding International Patent Application No. PCT/US2006/049561, mailed on Sep. 18, 2007, 5 pages.

ISA/EPO, "Written Opinion of the International Searching Authority," corresponding International Patent Application No. PCT/US2006/049561, mailed on Sep. 18, 2007, 9 pages.

ISA/EPO, "International Preliminary Report on Patentability," corresponding International Patent Application No. PCT/US2006/049561, mailed on Jul. 1, 2008, 10 pages.

China State Intellectual Property Office, "Notification of the First Office Action," corresponding Chinese Patent Application No. 200680052402.X, mailed on Jun. 25, 2010, 7 pages. (translation only).

China State Intellectual Property Office, "Notification of the Second Office Action," corresponding Chinese Patent Application No. 200680052402.X, mailed on Mar. 2, 2011, 7 pages. (translation only).

China State Intellectual Property Office, "Notification of the Third Office Action," corresponding Chinese Patent Application No. 200680052402.X, mailed on Aug. 5, 2011, 5 pages. (translation only).

\* cited by examiner

METHODS AND COMPOSITIONS FOR REMOVAL OF ARSENIC AND HEAVY METALS FROM WATER

RELATED APPLICATIONS

The present application is a U.S. National Stage entry under 35 U.S.C. §371 of and claims priority to International Application No. PCT/US2006/049561, filed Dec. 29, 2006, designating the United States of America and published in English on Jul. 12, 2007, which in turn claims priority to U.S. Provisional Application No. 60/754,838, filed Dec. 29, 2005, each of which is incorporated herein by reference in its entirety.

FIELD OF THE INVENTION

An improved method and compositions for purifying water is disclosed in accordance with preferred embodiments of the present invention. In preferred embodiments, the method is adapted to removal of arsenic and/or heavy metals from water.

BACKGROUND OF THE INVENTION

Arsenic, a highly poisonous metallic element that is found in rocks, soils and waters, affects more than 100 million people worldwide, according to the World Health Organization (WHO). WHO reports that arsenic poisoning is prevalent in a number of countries around the world, including Bangladesh, India, Argentina and China, including Taiwan. WHO estimates that arsenic in drinking water will cause 200,000 to 270,000 deaths from cancer in Bangladesh alone. In the United States, the Environmental Protection Agency reports that thirteen million people in more than twenty states are affected by arsenic contaminated drinking water. Medical problems linked to arsenic ingestion include skin cancer and bladder cancer, among other illnesses.

Industrial technologies for removal of arsenic from water include: precipitation processes, adsorption processes, ion exchange (IX) processes, membrane filtration, alternative treatment processes such as greensand filtration, and point-of-use devices (POU). There are a number of developing technologies for the removal of heavy metals from drinking water, including: iron oxide coated sand, nanofiltration, iron filings, sulfur-modified iron, granular ferric hydroxide, biological settling processes and plant intake methods. However, these technologies often require multiple treatment stages or combination of various technologies to achieve acceptable water quality, and are difficult and expensive to manufacture and operate. Additionally, there is a big problem with safe and effective waste disposal after the water has been purified using the above technologies.

Accordingly, robust and affordable technologies to handle arsenic and/or heavy metal removal from water, as well as safe disposal of these toxic substances, appear as the best option to resolve increasing health problems associated with arsenic and/or heavy metal contamination.

SUMMARY OF THE INVENTION

The technologies mentioned above suffer from various flaws. For example, iron oxide coated sand is difficult to manufacture. Filtration methods, including membrane filtration, RO, electrodialysis reversal (EDR) and nanofiltration, can be expensive and difficult to operate. Additionally, disposal of waste is problematic. Membranes consistently clog and are thus befouled. Iron filings, sulfur-modified iron and granular ferric hydroxide all require backwash. The biological settling process and plant intake methods are both difficult to operate and are socially unacceptable. Precipitative processes, including coagulation/filtration (C/F), direct filtration, coagulation assisted microfiltration, enhanced coagulations, lime softening, and enhanced lime softening all suffer from problems such as pH adjustment problems. Adsorption processes, specifically activated alumina, have low capacity and alumina problems. Although carbon-based purification can remove some organic pollutants from drinking water, carbon is ineffective for removing heavy metals and arsenic, particularly As(III) and As(V). Physical purification, such as oxide metals, requires pH adjustment and suffers from clogging.

In some embodiments, what is needed is an efficient, cost-effective, easy to operate, low maintenance method of removing heavy metals, including As(III) and As(V) from fluid.

A medium for removal of a contaminant in a fluid is disclosed in accordance with some embodiments of the present invention. The medium has a high porosity and comprises iron, clay, carbon and an Iron-Silica complex coating.

A medium for removal of a contaminant in a fluid is disclosed in accordance with some embodiments of the present invention. The medium has a high porosity and comprises a pottery granule comprising iron, clay and carbon with an Iron-Silica complex coating.

A method for producing an iron coated pottery granule (ICPG) is disclosed in accordance with some embodiments of the present invention. The method comprises: obtaining a porous pottery granule; coating the pottery granule with iron powder; and re-firing the pottery granule.

A method for producing a porous pottery granule is disclosed in accordance with some embodiments of the present invention. The method comprises mixing a clay, a carbon source material, and a porosity control chemical to obtain a mixture; and firing the mixture in an anoxic chamber at a temperature of between 590 and 630° C.

A method for removing a contaminant from a fluid is disclosed in accordance with some embodiments of the present invention. The method comprises contacting the fluid with an iron coated pottery granule (ICPG).

A filtration system for removing a contaminant from a fluid is disclosed in accordance with some embodiments of the present invention. The medium comprises a container and a plurality of ICPGs.

DESCRIPTION

Figure 1:
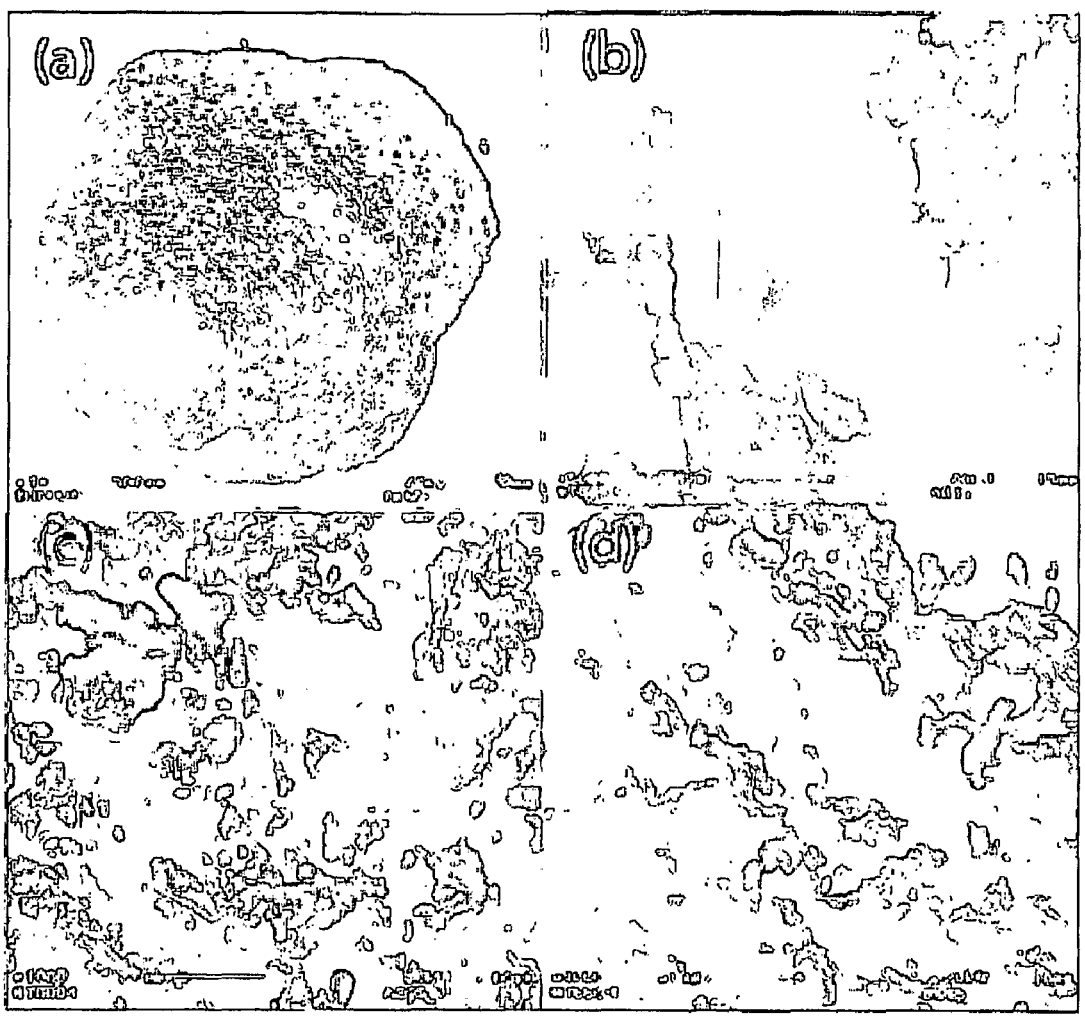
FIG. 1 depicts a scanning electron micrograph of ICPG granule: (a) Whole granule (500 µm bar), magnification 74; (b) close up of ICPG pore (5 µm bar); (c) and (d) surface before (c) and after (d) use as filter medium (20 µm bar), topographic, magnification 1000.

Embodiments of the invention are disclosed herein, in some cases in exemplary form or by reference to one or more Figures. However, any such disclosure of a particular embodiment is exemplary only, and is not alone indicative of the full scope of the invention.

Arsenic Environmental Geochemistry

Arsenic (As or As, Atomic no.: 33; atomic mass: 74.922 gm/mol) is commonly found throughout the environment in a wide array of chemical species that vary in toxicity and mobility (Francesconi, K. A. and D. Kuehnlt (2004). "Determination of arsenic species: A critical review of methods and applications, 2000-2003." *Analyst* 129(5): 373-395, the entire text of which is incorporated by reference in its entirety.) The distribution of arsenic species [As(III), As(V)] in natural waters is mainly dependent on redox potential and pH conditions (Tallman, D. E. and A. U. Shaikh (1980). "Redox Stability of Inorganic Arsenic(III) and Arsenic(V) in Aqueous-Solution." *Analytical Chemistry* 52(1): 197-199, the entire text of which is incorporated by reference in its entirety). Under the redox conditions of natural water systems, arsenic is commonly found in both oxidized and reduced oxidation states (Pourbaix, M. (1966) Atlas of electrochemical Equilibria in Aqueous solutions, Pergamon Press, Oxford, p. 644, the entire text of which is incorporated by reference in its entirety.) Zero-valent metallic arsenic is thermodynamically stable in water, and reduced forms of arsenic are often found in mineral solids, as in FeAsS(s) and $FeAs_2$(s) (Vink, B. W. (1996). "Stability relations of antimony and arsenic compounds in the light of revised and extended Eh-pH diagrams." *Chemical Geology* 130(1-2): 21-30, the entire text of which is incorporated by reference in its entirety.) Under the pH and redox conditions of most groundwaters and surface waters, dissolved arsenic exists as the As(V) (arsenate) species, $H_2AsO_4$ and $HAsO_4^{2-}$, and the As(III) (arsenite) species, $H_3AsO_3$ and $H_2AsO_3$ (Cullen, W. R. and K. L. Reimer (1989). "Arsenic speciation in the environment." *Chem. Rev.* 89:713-764; Farrell, L., Wang, P., O'Day, and M. Conklin (2001). "Electrochemical and spectroscopic study of arsenate removal from water using zero-valent iron media." *Environmental Science & Technology* 35(10): 2026-2032; Wang, L., Yang, S. Hou, J. Tan and H. Li, "Prevention of endemic arsenism with selenium" *Curr. Sci.* 18 (2001) 9:1215-1218; each of which is hereby incorporated by reference in its entirety). Under oxidizing conditions, such as those prevailing in surface waters, the predominant species is pentavalent arsenic, which is mainly present with the respective oxy-anionic forms $H_2AsO_4^-$ and $HAsO_4^{2-}$ (Kartinen, E. O. and C. J. Martin (1995). "An overview of arsenic removal processes." *Desalination* 103(1-2): 79-88, the entire text of which is incorporated by reference in its entirety.) On the other hand, under mildly reducing conditions (negative oxidation/reduction potential), such as those prevailing in most groundwaters, As(III) is thermodynamically stable. In the pH range normally found in municipal water supplies (pH 6 to 9), As(III) is found primarily as nonionic form of arsenious acid ($H_3AsO_3$) (Cullen and Reimer 1989; Kartinen and Martin 1995). As a result, As(III) does not interact with most solid surfaces; therefore, As is more difficult to remove by the application of conventional treatment methods, such as adsorption, precipitation, etc. On the other hand, in this same pH range, As(V) is found primary as $H_2AsO_4$ and $HAsO4^{2-}$. This pentavalent form of As is more easily removed from water than As(III).

As is a redox sensitive element; its behavior (e.g., redox transitions, solubility/mobility, scavenging) is controlled by geochemical conditions (e.g., especially pH and redox potential) and microbial activity. This creates the possibility of a wide variety of unstable arsenic species that can transform with subtle changes in the environment. To determine the potential transformation and risk of arsenic in the environment for remediation decisions, the analysis of environmental samples should include identification of chemical species of As and quantification of both the total quantity of arsenic present and the specific chemical forms (inorganic and organic) present (Francesconi and Kuehnelt 2004; Gong, Z., X. Lu, M. Ma, C. Watt and X. C. Le (2002a). "Arsenic speciation analysis." *Talanta* 58(1): 77-96; Melamed, D. (2005). "Monitoring arsenic in the environment: a review of science and technologies with the potential for field measurements." *Analytica Chimica Acta* 532(1):1-13. Each of the foregoing references is hereby incorporated by reference in its entirety). However, care must be taken to ensure the preservation of arsenic speciation in a given sample (Bednar, A. J., J. R. Garbarino, J. F. Ranville and T. R. Wildeman (2002). "Preserving the distribution of inorganic arsenic species in groundwater and acid mine drainage samples." *Environmental Science and Technology* 36(10): 2213-2218; McCleskey, R. B., D. K. Nordstrom and A. S. Maest (2004). "Preservation of water samples for arsenic (IIIIV) determinations: an evaluation of the literature and new analytical results." *Applied Geochemistry* 19(7): 995-1009. Each of foregoing references is hereby incorporated by reference in its entirety).

In many environments, the As (V) is often de-protonated as an arsenate anion (i.e., $H_3AsO_4$, $H_2AsO_4^{-1}$, and $AsO_4^{-3}$), which is in contrast to the As(III) oxyacid that remains predominantly in its neutral form as arsenite (i.e., $H_3AsO_3$). Arsenate, arsenate anions, and neutral arsenite constitute the main targets for field analytical assays. In contaminated soils, inorganic arsenate is the predominant species (Garcia-Manyes, S., G. Jimenez, A. Padro, R. Rubio and G. Rauret (2002). "Arsenic speciation in contaminated soils." *Talanta* 58(1): 97-109, the entire text of which is incorporated by reference in its entirety.) In general, arsenate and other As (V) species are immobilized on geologically available surfaces, often on iron oxides (Matera, V., I. Le Hecho, A. Laboudigue, P. Thomas, S. Tellier, et al. (2003). "A methodological approach for the identification of arsenic bearing phases in polluted soils." *Environmental Pollution* 126(1): 51-64, the entire text of which is incorporated by reference in its entirety). Although As (V) species are considered to be a relatively low risk, bacterial activity can readily convert them into more mobile and more toxic forms of arsenic species (Macur, R. E., C. R. Jackson, L. M. Botero, T. R. McDermott and W. P. Inskeep (2004). "Bacterial Populations Associated with the Oxidation and Reduction of Arsenic in an Unsaturated Soil." *Environmental Science and Technology* 38(1): 104-111, the entire text of which is incorporated by reference in its entirety).

Groundwater and soils also contain organoarsenic species: monomethylarsenic acid, dimethylarsenic acid, trimethylarsine oxide, and trimethyl arsine. In general organoarsenic compounds are less toxic than their corresponding oxyacids (Le, X. C., S. Yalcin and M Ma (2000). "Speciation of submicrogram per liter levels of arsenic in water: On-site species separation integrated with sample collection." *Environmental Science and Technology* 34(11): 2342-2347, the entire text of which is incorporated by reference in its entirety). Organoarsenic compounds are usually found in lower concentrations; however, under the right conditions, they can be found in very high concentrations. For example, in freshwater lakes, methylated arsenic can make up to 60% of the total arsenic (Anderson, L. C. D. and K. W. Bruland (1991). "Biogeochemistry of arsenic in natural waters: the importance of methylated species." *Environmental Science& Technology* 25(3): 420-427, the entire text of which is incorporated by reference in its entirety). Similar biological activity could result in an increased concentration of organoarsenic species in soils or other environmental samples. There are also arsenic sulfur species that constitute a sizable portion of arsenic in rocks, sediments and natural waters (Cullen and Reimer 1989), (Floroiu, R. M., A. P. Davis and A. Torrents (2004). "Kinetics and Mechanism of As2S3(am) Dissolution under N2." *Environmental Science and Technology* 38(4): 1031-1037; Wood, S. A., C. D. Tait and D. R. Janecky (2002). "A Raman spectroscopic study of arsenite and thioarsenite species in aqueous solution at 25 [deg]C." *Geochemical Transactions* 3: 31-39. Each of foregoing references is hereby incorporated by reference in its entirety). Organoarsenic and thioarsenic compounds are less common and thought to be less toxic than inorganic arsenic oxyacids, however, they constitute a sizable fraction of the naturally occurring arsenic and should be targeted in field measurements and remediation efforts.

Global Scale Arsenic Contamination of Ground Water Aquifers

The Environmental Protection Agency (EPA) has set the arsenic standard for drinking water at 10 parts per billion (0.01 mg/L) to protect consumers served by public water systems from the effects of long-term, chronic exposure to arsenic. Water systems were required to comply with this standard by Jan. 23, 2006, providing additional protection to an estimated 13 million Americans (EPA 2006). In a number of countries, the WHO provisional guidelines of 0.01 mg/L have been adopted as the standard. However, many countries have retained the earlier WHO guideline of 0.05 mg/L as the national standard or as an interim target. A number of European countries and Japan have adopted the WHO provisional guideline of 0.01 mg/L as their standard. A new standard value currently proposed is 0.005 mg/L. Countries where the national standard for arsenic in drinking water remains at 0.05 mg/L include Bangladesh, China and India (Yamamura, S., J. Bartram, M. Csanady, H. G. Gorchev and A. Redekopp, (2006), "Drinking Water Guidelines and Standards" from http://www.who.int/water_sanitation_health/dwq/arsenic3/en/, the entire text of which is incorporated by reference in its entirety). A number of large aquifers in various parts of the world have been identified as significantly contaminated with As concentrations above 50 µg/l, often significantly so. The most noteworthy occurrences are in parts of Argentina, Bangladesh, Chile, northern China, Hungary, India (West Bengal), Mexico, Romania, Taiwan (China) and many parts of the USA, particularly the southwest. Arsenic associated with geothermal waters has also been reported in several areas, including hot springs from parts of Argentina, Japan, New Zealand, Chile, Kamchatka, Iceland, France, Dominica and the USA. The scale of the problem in terms of population exposed to high As concentrations is greatest in the Bengal Basin with more than 40 million people drinking water containing 'excessive' As (Smedley, P. L. and D. G. Kinniburgh (2002). "A review of the source, behaviour and distribution of arsenic in natural waters." *Applied Geochemistry* 17(5): 517-568. Smedley, P. L. and D. G. Kinniburgh, "Source and behaviour of arsenic in natural waters" from http://www.who.int/water_sanitation_health/dwQ/arsenicunl.pdf (2006). Each of foregoing references is hereby incorporated by reference in its entirety). Populations at risk in Asia include: Bangladesh (more than 35,000,000), China (Inner Monolia, Xin Jiang and ShanXi: 5,600,000; Taiwan: 10,000), India (West Bengal, 5,000,000), Vietnam (10,000,000) (Ahmed, F., K. Minnatullah and A. Talbi (2006). Paper III. Arsenic Mitigation Technologies in South and East Asia *Toward a More Effective Operational Response. Arsenic Contamination in Ground Water in South and East Asian Countries*, The World Bank. II. Technical Report. Report No. 31303, the entire text of which is incorporated by reference in its entirety).

Economics of Arsenic Mitigation

Existing studies in the economic evaluation of arsenic mitigation alternatives generally employ the social cost-benefit analysis (CBA) framework Under this framework, a mitigation alternative is considered viable if it increases social welfare, i.e., the present value of its benefits exceeds its costs. While costs of mitigation alternatives can readily be determined, estimating the associated benefits can be quite a challenging task as the benefits are often intangibles not easily monetized and the epidemiological exposure-response relations are seldom known with certainty.

In a recent World Bank study, Koundouri, recognizing the difficulty in adopting an "ideal" CBA framework, utilized a more pragmatic approach which he coined as the Nth best model to evaluate the social net benefits of a range of arsenic mitigation technologies in Bangladesh (Koundouri, P. (2005). "The Economics of Arsenic Mitigation." *Towards a More Effective Operational Response: Arsenic Contamination of Groundwater in South and East Asian Countries*. 2: Technical Report: 210-262, the entire text of which is incorporated by reference in its entirety). Short of estimating all the associated benefits due to unavailability of data, he considered only two arsenic mitigation benefits related to human health: reduced occupational risks and reduced public health risks. The environmental impact on ecosystems and biodiversity is obviously more difficult to value in monetary terms and was not considered in his Nth best model. The reduced occupational risks was captured by the estimated saved output productivity and the reduced public health risks was captured by the estimated foregone medical costs resulting from arsenic exposure reduction. Koundouri emphasized that due to the omission of the environmental benefits and since the actual medical expenditures would not necessarily be sufficient for the treatment of arsenic-related illness, the net benefits would most likely be underestimated.

Several technology options were considered in the World Bank study: dug wells, rainwater harvesting plus dug wells, rainwater harvesting plus deep tubewells, deep tubewells, shallow tubewells, pond sand filters, deep production wells (piped), impoundment (piped), and river abstraction (piped). The study concluded that (Koundouri, 2005: p. 251): with the exception of the option of rainwater harvesting (+dug wells) when discounted at a 10% rate, all other considered mitigation technologies are welfare increasing (that is, they pass a cost-benefit analysis) under all levels of effectiveness at both 5% and 10% discount rates. However, when discounted at a 15% rate, many of the mitigation technologies do not pass a CBA at lower than 100% level of effectiveness. Moreover, rainwater harvesting (and dug wells) and rainwater harvesting (+deep tub wells) are not welfare increasing even at 100% of effectiveness. This result indicates that one needs to carefully evaluate what mitigation measures are implemented and that it is not true that any mitigation technology can be applied.

A U.S. EPA study conducted in 2000 analyzing the cost and benefit of reducing the arsenic level in community water systems to 10 µg/L also indicated that net benefits ranged from a $17.3 million to −$40.8 million at a discount rate of 3%, and net benefits were negative for the entire range of evaluation at 7%. These two studies point to the fact that current technologies in mitigating arsenic contamination are not conclusively welfare increasing particularly at lower levels of effectiveness as would be anticipated. The compositions and methods described herein are in connection with more effective, lower cost, more portable and easier to use means for removing arsenic from water.

Existing Remediumtion Technologies/Methods

The ideal system should meet several requirements: (1) sufficient strength and large surface area to allow granular packing; (2) efficient removal of both As(V) and As(III); (3) long duration, high capacity, selectivity, and high rate of adsorption; (4) high physical strength (not disintegrating) in water; (5) low cost and easy maintenance; (6) short hydraulic retention time (HRT) produced by high porosity; (7) safe disposal; (8) limited secondary problems affecting the quality of water. There are several methods available for removal of arsenic from water in large conventional treatment plants. The most commonly used processes of arsenic removal from water have been described elsewhere (Ahmed, Minnatullah et al. 2006; Cheng, R. C., H. C. Wang and M. D. Beuhler (1994). "Enhanced Coagulation for Arsenic Removal." *Journal American Water Works Association* 86(9): 79-90; Hering, J. G., P. Y. Chen, J. A. Wilkie and M. Elimelech (1997). "Arsenic removal from drinking water during coagulation." *Journal of Environmental Engineering—Asce* 123(8):800-807; Hering, J. G., P. Y. Chen, J. A. Wilkie, M. Elimelech and S. Liang (1996). "Arsenic removal by ferric chloride." *Journal American Water Works Association* 88(4): 155-167. Each of foregoing references is hereby incorporated by reference in its entirety). Comparison of the different techniques in terms of cost and commercial availability can be found in an up-to-date review by Ahmed et al. (Ahmed, Minnatullah et al. 2006). According to Ahmed et al., the most common arsenic removal technologies can be grouped into the following four categories: (a) Oxidation and sedimentation; (b) Coagulation and filtration; (c) Sorptive filtration; (d) Membrane filtration. Oxidation of As(III) and As(V) is needed for effective removal of arsenic from groundwater by most treatment methods. The oxidation process converts predominantly non-charged arsenite to charged arsenate, which can be easily removed from water. In the process of coagulation, As is removed from solution through three mechanisms: precipitation, coprecipitation and absorption. In the sorptive filtration approach, sorptive medium, (activated alumina, activated carbon, iron-coated sand, and the like) is used as an oxidizing agent for sorption As. Arsenic can be removed by synthetic membranes with pore sizes appropriate for the removal of As. Table I compares key As-removal technologies Unfortunately, none of these techniques can presently satisfy all eight of the above criteria.

TABLE I

Comparison of main existing Arsenic removal techniques.

| Method: Main Mechanism | Advantages | Disadvantages (D); Competitive Factors ©: Waste Dispoal (W) |
|---|---|---|
| Zero Valent Iron: The removal of arsenic was mainly attributed to adsorption on iron hydroxides produced through the oxidation of Fe(0) by dissolved oxygen (Bang, Korfiatis et al. 2005) | Highly efficient low pH good for in-situ treatment and aqueous injection | The pH must less than 7 because of the reaction dependence on corrosion. Iron leachate, toxic sludge and difficulties with iron powder separation. Produces toxic sludge; (C) silicate and carbonate effects the rate of As removal |
| Coagulation/filtration: By adding a coagulant such as alum, ferric chloride, or ferric sulfate to contaminated water, much of the arsenic can be removed. If arsenic is present as arsenite, the water should be oxidized first, using chlorine, permanganate, ozone, or other oxidants. (Johnston, Heijnen et al. 2001) | Easy for direct application; efficiency around 95%-90% | (D) Is not very efficient. Silicate and phosphate dramatically reduce the removal rate It generates large amount sludge. (C) Silicate and phosphate dramatically reduce the rate of removal (Bang, Korfiatis et al. 2005) |
| Activated Alumina: Activated Alumina (AA) is a physical/chemical process by which ions in the feed water are sorbed to the oxidized AA surface (EPA 2000; Lin and Wu 2001) | Short empty bed contact time (EBCT) control: 95% (EPA 2000) | (D) Strong sulfate acid is required for regeneration; (C) Competing ions are OH—, $SiO_4$, $2-HSeO_3$, TOC. (W) Hazard waste generated from (AA) regeneration. |
| Granulated ferric oxide and hydroxide (GFH): The adsorption is dominated by surface complexation between the acidic functional groups of the salicylic acid and the hydrated Fe surface groups of the GFH surface. (Daus, Wennrich et al., 2004; Pal 2001; Yost, Tejedor-Tejedor et al. 1990) | Highly efficient (90%) for both As(III) and As (V). | (D) GFH should be kept wet and fresh during transportation?. Production of GFH requires numerous chemical components. Backwash is required during operation. (C) Main competing ion is $PO_4$. |
| Iron-coated sand or mixed sand. Adsorption on a mixture of zero valent iron filings and sand through formation of coprecipitates; mixed precipitates, and adsorption onto the ferric hydroxide solids (Nikolaidis and Lackovic 1998). | High efficiency (97%) for As(V) and As(III); simple production, and is good for pretreatment. | (D) Excess iron must be removed from source water. (C) Silicate and carbonate are main competing ions. (W) Waste can be disposed in a landfill. |
| Chloride resin ion exchange. Ion on the solid phase exchanged for an ion in the feed water. | Short Empty Bed Contact Time (EBCT) for arsenic removal. Efficiency: 95%. | (D) Works only for low-TDS and low-sulfate water source. Usually as (III) cannot be removed (C) Sulfate, nitrate and chloride are main competing ions: (W) Waste regeneration process produces |

TABLE I-continued

Comparison of main existing Arsenic removal techniques.

| Method: Main Mechanism | Advantages | Disadvantages (D); Competitive Factors ©: Waste Dispoal (W) |
|---|---|---|
| | | hazard sludge (Hodi, Polyak et al. 1995) |

Iron Coated Pottery Granules (ICPG, MicroNose™)

FIG. 1 shows an embodiment of a composition that can be used to perform a variety of methods or procedures. FIGS. 1a and b show scanning electron micrographs of an Iron Coated Pottery Granule (ICPG, MicroNose™) and ICPG pore, respectively. The ICPG is made of highly porous pottery that is coated with iron. Methods for producing ICPG are disclosed in accordance with some embodiments of the present invention. In some embodiments, as discussed more fully below, an ICPG medium system is useful for removing a contaminant from a fluid.

When the ICPG medium contacts a fluid, such as water, and undergoes the rehydration process, it forms an Fe—Si complex. This Fe—Si complex of the ICPG is a silica gel, and has the ability to adsorb arsenic and heavy metals ions. A comparison of the SEM images (FIGS. 1c and d) of the ICPG granule surfaces before and after use as filter medium indicates that reaction or absorption occurs not only on the grain surface but also spreads to the surface of the open channels in each grain. Preliminary studies demonstrate that the pottery granules without Fe(0) coating were able to remove As, but only could last for a short period of time (2-3 hours), while those coated with Fe(0) could sustain the removal efficiency over extended periods. The arsenic adsorption capacity of the uncoated granules was only 0.8 mg/g, which is 1% of the ICPG adsorption capacity. These simple tests demonstrated that Fe(0) coating of the pottery granules played an important role in the removal of As from water.

Zero-valent iron has been found recently to be extremely promising for removal of arsenic from groundwater (Farrell, L., L. Wang, P. O'Day and M. Conklin (2001). "Electrochemical and spectroscopic study of arsenate removal from water using zero-valent iron media." Environmental Science & Technology 35(10): 2026-2032; Lackovic, J. A., N. P. Nikolaidis and G. M. Dobbs (2000). "Inorganic arsenic removal by zero-valent iron." Environmental Engineering Science 17(1): 29-39; Leupin, O. X. and S. J. Hug (2005). "Oxidation and removal of arsenic (III) from aerated groundwater by filtration through sand and zero-valent iron." Water Research 39(9):1729-1740; Manning, B. A., M. L. Hunt, C. Amrhein and L. A. Yarmoff (2002). "Arsenic(III) and Arsenic (V) reactions with zerovalent iron corrosion products." Environmental Science & Technology 36(24): 5455-5461. Each of foregoing references is hereby incorporated by reference in its entirety). The mechanism of arsenic removal was suggested to involve adsorption of As(III) and As(V) on iron oxides formed in-situ as a result of the Fe(0) corrosion reaction (e.g., Kanel, S. R., B. Manning, L. Charlet and H. Choi (2005). "Removal of arsenic(III) from groundwater by nanoscale zero-valent iron." Environmental Science & Technology 39(5):1291-1298; Farrell, Wang et al. 2001; Lackovic, Nikolaidis et al. 2000; Su, C. and R. W. Puls (2001). "Arsenate and arsenite removal by zerovalent iron: Kinetics, redox transformation, and implications for in situ groundwater remediation." Environmental Science and Technology 35(7): 1487-1492. Each of foregoing references is hereby incorporated by reference in its entirety). It was also shown that the amount of the dissolved oxygen in the water also plays an equally important role in the removal process (e.g., Bang, S., G. P. Korfiatis and X. G. Meng (2005). "Removal of arsenic from water by zero-valent iron." Journal of Hazardous Materials 121(1-3): 61-67, the entire text of which is incorporated by reference in its entirety).

The high efficiency of ICPG system does not require oxygen to be pumped into the system. This suggests that the mechanism of the As removal from water by ICPG is different from that with pure F(0). The EBCT for the ICPG system is 5.5 min for a 0.85 ppm As solution, compared to 3.2 min for a 0.22 ppm As solution for iron fillings at normal pH (Bang, S., M. D. Johnson, G. P. Korfiatis and X. G. Meng (2005). "Chemical reactions between arsenic and zero-valent iron in water." Water Research 39(5): 763-770; Bang, S., G. P. Korfiatis and X. G. Meng (2005). "Removal of arsenic from water by zero-valent iron." Journal of Hazardous Materials 121(1-3): 61-67. Each of foregoing references is hereby incorporated by reference in its entirety). Therefore the efficiency/EBCT ratio of the ICPG system is 0.85/5.5=0.155, 2.2 times higher that that of iron fillings (0.22/3.2=0.069). Moreover, after arsenic absorption, the iron fillings system requires use of a sand filter (Bang, Korfiatis et al. 2005) to remove arsenic containing iron oxides and iron hydroxides from the treated water at short EBCT while maintaining high dissolved oxygen and neutral pH. In contrast, in the ICPG system, adsorbed As appears to not desorb back into water and is strongly bonded to the ICPG. It is to be noted that the efficiency of As removal by a pure F(0) system is strongly dependent on the pH, whereas the effect of the pH on the rate of As removal by the ICPG system is small. Use of pure iron powder methods result in liquid/solids separation problems when used in water treatment plants. In addition, two steps are required to restore neutral pH and remove excess Fe.

A strong chemical affinity between Fe(III) and Si is demonstrated by the formation, under both natural and laboratory conditions, of iron silicates like nontronite, ferric chlorites/serpentines and smectites (e.g., (Bailey, S. W. (1988). "Odinite, a new dioctahedral-trioctahedral Fe-rich 1:1 clay mineral." Clay Minerals 23(3): 237-247; Decarreau, A., D. Bonnin, D. Badaut-Trauth and R. Couty (1987). "Synthesis and crystallogenesis of ferric smectite by evolution of Si—Fe coprecipitates in oxidizing conditions." Clay Minerals 22(2): 207-223, and references therein. Each of foregoing references is hereby incorporated by reference in its entirety). The presence of silica in solution significantly influences Fe(III) hydrolysis and precipitation (Vempati, R. K. and R. H. Loeppert (1989). "Influence of structural and adsorbed Si on the transformation of synthetic ferrihydrite." Clays and Clay Minerals 37(3): 273-279, the entire text of which is incorporated by reference in its entirety). The formation of the Fe—Si complexes and their influence on As removal have been discussed in the literature (Pokrovski, G. S., J. Schott, F. Garges and J. L. Hazemann (2003). "Iron (III)-silica interactions in aqueous solution: Insights from X-ray absorption fine structure spectroscopy." Geochimica Et Cosmochimica Acta 67(19): 3559-3573; Swedlund P. J. and Webster J. G. (1999)

"Adsorption and polymerization of silicic acid on ferrihydrite, and its effect on arsenic adsorption," *Water Research* 33 (1999), pp. 3413-3422; Zeng, L. (2003). "A method for preparing silica-containing iron(III) oxide adsorbents for arsenic removal." *Water Research* 37(18): 4351-4358; Zheng, L. (2004). "Arsenic adsorption from aqueous solutions on an Fe(III)-Si binary oxide adsorbent." *Water Quality Research Journal of Canada* 39(3): 267-275; Zhang, F. S, and H. Itoh (2005). "Iron oxide-loaded slag for arsenic removal from aqueous system." *Chemosphere* 60(3): 319-325. Each of foregoing references is hereby incorporated by reference in its entirety). It was found that iron(III) oxide-loaded melted slag (IOLMS) containing Fe—Si surface complexes were at least 2.5 times as effective as those containing FeOOH (Zhang and Itoh 2005).

In some embodiments, the ICPG are prepared from porous, large surface area pottery granules. The pottery granules are screened and selected by size fractionation for iron coating. The selected pottery granules are rehydrated and coated with iron. Finally, the coated pottery granules are re-fired to obtain ICPG.

Porous, large surface area pottery granules useful for the preparation of ICPG are not commercially available. Suitable porous, large surface area pottery granules useful for preparing the ICPG may be prepared by, for example, mixing a clay, a carbon source material, and porosity control chemicals to obtain a mixture; and firing the mixture in an anoxic chamber at about 600-630° C. In some embodiments, the clay and carbon source material are first dry mixed, and the porosity control chemicals are gradually sprayed into the dry mix to form a wet mixture, and this wet mixture is fired to form the porous pottery granules. During the firing process, the carbon source and porosity control chemicals, which form a volatile composition, creates pores in the resulting pottery granules.

In some embodiments, the porous pottery granules are obtained by combining 10 kg clay powder with 5 kg flour (or starch) in a dry mix for five to ten minutes. One gallon of liquid wax is combined with one gallon of water. The water-wax mix is gradually added to the dry mix of clay powder and flour by spraying into the dry mix while continuously mixing the clay-flour mixture over a twenty-minute time period, thereby resulting in a wet granule mixture. A granule mixer may be used to mix the mixture while adding the water-wax mix. The wet granule mixture is placed in an iron bottle, which is placed in the kiln. An example of the pottery granule firing process for the pottery granules is summarized in Table II. The granule mixture is under anoxic conditions fired at 110° C. (230° F.) for two hours. Subsequently, the kiln is heated to 630° C. (1166° F.) and held for three hours at a heat rate of 194° F. per hour. The kiln is then cooled down. Once the kiln has cooled, the porous pottery granules are ready for use in preparing ICPG.

TABLE II

Firing and Temperature Control for Porous Pottery Granules

| | ° F. | ° C. | Hold (hr) | RTP (° F./h) | Iron Bottle |
|---|---|---|---|---|---|
| SEG 1 | 230 | 110 | 2 | 194 | Without air |
| SEG 2 | 1166 | 630 | 3 | 194 | |

The clay, which is in dry powder form, is first combined with the carbon source material, which may be a flour or starch, to for a dry mix. Typically, the clay and carbon source material are dry mixed for between about 1 and 20 minutes to combine. In some embodiments, the clay and carbon source material are dry mixed for about 1, 2, 3, 4, 5, 6, 7, 8, 9, 10, 11, 12, 13, 14, 15, 16, 17, 18, 19 or 20 minutes to combine. In some embodiments, the clay and carbon source material are dry mixed for about 5 to 10 minutes. Granule makers useful for mixing the clay and carbon source material are commercially available in the ceramic industry. A mixer useful for the present invention may be, for example, a rounded mixer. The clay may comprise between 30 and 90% of the total dry mix. In some embodiments, the clay comprises about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89 or 90% of the total mixture. In some embodiments, the clay comprises about 67% of the total dry mix. The carbon source material may comprise between 10 and 70% of the total dry mix. In some embodiments, the carbon source material comprises about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69 or 70% of the total dry mix. In some embodiments, the carbon source material comprises about 33% of the total dry mix.

Clays useful for the present invention include, for example without limitation, kaolinites, montinorillonite/smectites, red clay and molar clay. Kaolinites include, for example, kaolinite, dickite, and nacrite. Montmorillonite/smectites include, for example, pyrophyllite, talc, vermiculite, sacuonite, saponite, nontronite and montmorillonite. The clays used in the present invention may be, for example, in dry powder form and are commercially available.

Carbon sources useful for the present invention include, for example without limitation, a carbohydrate, e.g. a sugar such as lactose, fructose, or sucrose, whey powder, flour, wheat flour, rice flour, coruneal, oat bran, white sugar, brown sugar, corn starch, potato starch, other starches, wood powders, and coconut shell powders. In some embodiments, the carbon source is flour. Such carbon sources are widely commercially available.

Porosity control chemicals useful for the present invention include, for example without limitation, liquid wax, beeswax, animal fats, oils such as corn oil, olive oil, and other vegetable and plant oils, and paraffin. In some embodiments, to prepare the porous pottery granules, the porosity control chemical is mixed with water and then sprayed into the dry mix of clay and carbon source with constant agitation. In some embodiments, about one gallon of porosity control chemical is used for every 15 kg of dry mix. The amount of porosity control chemical used may be, for example, about 0.50 to 1.5 gallon(s) for every 15 kg of dry mix. In some embodiments, the amount of porosity control chemical is about 0.50, 0.55, 0.60, 0.65, 0.70, 0.75, 0.80, 0.85, 0.90, 0.95, 1.0, 1.05, 1.10, 1.15, 1.20, 1.25, 1.30, 1.35, 1.40, 1.45 or 1.50 gallon(s) for every 15 kg of dry mix. In some embodiments, the porosity control chemical is mixed with an equal volume of water prior to being added to the dry mix. The porosity control, chemical may be mixed with, for example, from about 0 to 2 volume(s) of water prior to addition to the dry mix. In some embodiments, the amount of water added to the porosity control chemical is about 0, 0.5, 0.55, 0.6, 0.65, 0.7, 0.75, 0.8, 0.85, 0.9, 0.95, 1, 1.05, 1.1, 1.15, 1.2, 1.25, 1.3, 1.35, 1.4, 1.45, 1.5, 1.6, 1.7, 1.8, 1.9 or 2.0 volume(s).

The wet granule mixture resulting after the porosity control chemical is added to the dry mix of clay and carbon source is fired to produce the porous pottery granules. In some embodiments, the wet granule mixture is placed into a heat-resistant container during the firing process. In some embodiments, the heat-resistant container is an iron bucket. The firing process uses a regular ceramic kiln with automatic controllable firing. In some embodiments, a Cone 10 kiln with automatic firing and a temperature controller and industrial sieves is used. The firing process occurs in two heating cycles or phases. The first heating cycle may be between about an hour to three hours long at between about 80 and 150° C. In one embodiment, the first heating cycle may be about two hours at 110° C. (230° F.). The temperature of the first heating cycle may be, for example, 80, 90, 100, 110, 120, 130, 140 or 150° C. The first heating cycle may be, for example, 60, 65, 70, 76, 80, 85, 90, 95, 100, 105, 110, 115, 120, 125, 130, 135, 140, 145, 150, 155, 160, 165, 170, 175 or 180 minutes long. The second heating cycle may be, for example, between about an hour to five hours long at between about 500 and 700° C. In some embodiments, the second heating cycle is 1, 1.5, 2, 2.5, 3, 3.5, 4, 4.5 or 5 hours long. In some embodiments, the temperature of the second heating cycle may be, for example, 500, 550, 560, 570, 580, 590, 600, 610, 620, 630, 640, 650, 660, 670, 680, 690 or 700° C. The heat rate may be, for example, between 170 and 210° F. and hour. In some embodiments, the heat rates is 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209 or 210. In some embodiments, the second heating cycle is about three hours long at 630° C. (1166° F.) and has a heat rate of 194° F. per hour. An example of the pottery granule firing process for the pottery granules is summarized above in Table II. The firing process is controlled under anoxic conditions. This allows the carbon to remain inside the clay granules and prevents the formation of carbon dioxide. The remaining carbon creates a large surface area to granule. In some embodiments, the firing process is pre-programmed by an automatically controllable kiln.

After firing is completed, the kiln is then cooled down. Once the kiln has cooled, the porous pottery granules are ready for making ICPG. The porosity of the porous pottery granules may be, for example, between 40 and 85%. In some embodiments, the porosity of the porous pottery granules is 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84 or 85%.

The manufacturing process for the porous pottery granules can be set up as an industrial production line.

Screening and size selection of the porous pottery granules may be carried out, for example, using several layers of various-sized screens, e.g. 40 mesh, 16 mesh, 8 mesh, 6 mesh. In some embodiments, a screening device for sorting granules has screens of 40 mesh, 16 mesh, 8 mesh, 6 mesh. The screens may be, for example, between 4 and 50 mesh. In some embodiments, the screens are 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40 41, 42, 43, 44, 45, 46, 47, 48, 49 or 50 mesh. In some embodiments, a screening device for sorting granules has screens of 40 mesh, 16 mesh, 8 mesh, 6 mesh. This provides granules sized between 40-16 mesh, 16-8 mesh, 8-6 mesh. The mesh used is the U.S. screen size standard. Screening devices useful for selection of pottery granules are commercially available.

One the porous pottery granules are screened for size, they are re-hydrated. Because the granules tend to become sticky or viscous after re-hydration, it is preferable to gradually re-hydrate by spraying water onto the granules as they are mixed in a rounded mixer. Between 1-20% w/w of water may be used for coating the granules. In some embodiments, between 2-3% w/w of water is used to re-hydrate the granules. In some embodiments, 1, 2, 3, 4, 5, 6, 7, 8, 9, 10, 11, 12, 13, 14, 15, 16, 17, 18, 19 or 20% w/w of water is used to re-hydrate the granules. In some embodiments, 10 kg of porous pottery granules are re-hydrated by spraying one liter of water into the granules while the granules are agitated in a running mixer. In some embodiments, the pottery granules are placed in the mixer and sprayed with 10% w/w water while under agitation, and mixed for 15 minutes to re-hydrate.

The iron powder is added gradually to the re-hydrated granules to coat them. The gradual addition of the iron powder provides an even coating. The iron powder may be added to the granules, with constant mixing, over a period of 1, 2, 3, 4, 5, 6, 7, 8, 9, 10, 11, 12, 13, 14, 15, 16, 17, 18, 19, 20, 21, 22, 23, 24, 25, 26, 27, 28, 29 or 20 minutes. In some embodiments, the addition of iron powder occurs in about fifteen minutes with constant mixing. Iron powders useful for the present invention may be, for example without limitation, iron oxide, zero valent iron powder, zero valent iron anoxide, reductive iron powder, iron powders having an iron content of more than 98%, and pure iron powders. Zero valent iron can be purchased worldwide and is commonly known in the industry. For example, zero valent iron powder is commercially available from various U.S. companies, including Capture, Inc., Global Material Inc., and Artis Technologies, Inc.

The iron coated granules are re-fired according to the firing process for the porous pottery granules described above. The Fe—Si solid phase surface complexes are formed during this firing process, and the strength of the granules are increased by the firing process. This is a characteristic of re-hybridized pottery. In some embodiments, the ICPG granular size is less than 2.36 mm. In some embodiments, the porosity is 75-80% and the specific surface area of medium pre-coating and after coating are 212 $m^2/g$ and 40 $m^2/g$, respectively. In some embodiments the pH of ICPG (40% ICPG and 60% water) is 7.1.

The porosity of the ICPG can be, for example without limitation, between 35-85%. In some embodiments, the porosity may be about 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, or 85%. In a preferred embodiment, the porosity is about 78% and the specific surface area of the pre-coated medium and post-coated medium can be, for example, 212 $m^2/g$ and 40 $m^2/g$, respectively.

Porosity as used herein is defined as volume/weight (cc/gram), meaning the volume of the pores for each gram granules. The specific surface area of the pre-coated medium the pre-coated and post-coated medium can be, for example, between 150 $m^2/g$ and 300 $m^2/g$, and between 20 $m^2/g$ and 80 $m^2/g$, respectively. In some embodiments, the specific surface area of the pre-coated medium can be about 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 166, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299 or 300 $m^2/g$. In some embodiments, the specific surface area of the post-coated medium can be about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79 or 80 m²/g, respectively. In some embodiments, the specific surface areas of the pre-coated and post-coated medium are about 212 m²/g and about 40 m²/g, respectively. These properties make the ICPG a highly permeable and adsorptive medium. In some embodiments, the pH of ICPG (40% ICPG and 60% water) is about 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9 or 11. In some embodiments, the pH of ICPG is 7.1.

In some embodiments, the ICPG granule is about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9 or 3.0 mm in diameter. In another embodiment the ICPG granule is between 1.0 to 2.36 mm in diameter. In a preferred embodiment, the ICPG granule is less than 2.36 mm in diameter. The ICPG contains a plurality of pores in size of about 10-20 μm. In some embodiments, the pore size can be about 9, 10, 11, 12, 13, 14, 15, 16, 17, 18, 19 or 20 μm. In some embodiments, the total pore volume can be about 0.10 cc/g to 1.0 cc/g. In some embodiments, the total pore volume can be about 0.28 cc/g. In some embodiments, the total pore volume is about 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99 or 1.0 cc/g. The ICPG granules are water permeable. At the surface of ICPG granules, the iron and clay form a rough Fe—Si complex surface structure where arsenic ions and heavy metal ions can be adsorbed. After arsenic and/or heavy metal adsorption, the surface structure is smoother (FIG. 1d). The water flow and arsenic adsorption take place on the surface of the medium and the inside surface area of the holes in the medium.

In some embodiments, as discussed more fully below, a basic ICPG medium system is used to remove a contaminant from a fluid. In some embodiments, the contaminant is arsenic. In some embodiments, the contaminant is As(III). In some embodiments, the contaminant is As(V). In another embodiment, the contaminant is a heavy metal. In some embodiments, the contaminant is a combination or mixture of heavy metals. As used herein, the term "metal" refers without limitation to an element of Groups 3 through 13, inclusive, of the periodic table. Thus, the term "metal" broadly refers to the all metal elements, including the metalloids. Group 13 elements, and the lanthanide elements. Specific metals suitable for use in the present invention include, for example and without limitation: aluminum (Al), antimony (Sb), arsenic (As), barium (Ba), cadmium (Cd), cobalt (Co), chromium (Cr), copper (Cu), iron (Fe), lead (Pb), mercury (Hg), manganese (Mn), molybdenum (Mo), nickel (Ni), selenium (Se), silicon (Si), silver (Ag), tin (Sn), titanium (Ti), vanadium (V) and zinc (Zn). As used herein, the term "metal" also refers to metal/metallic ions thereof, salts of the metal thereof.

In some embodiments, the contaminant is present in a fluid at about 300 ppb or less. The removal rate of contaminant varies with the contact time. In some embodiments, for fifteen minutes of contact time, the removal rate is 99.9% for a pure water solution. In some embodiments, the contaminant is present in the fluid at about 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490 or 500 ppb.

On ICPG surfaces, the iron and clay substrate forms a rough surface structure where arsenic ions and heavy metal ions are adsorbed. Following extensive flow-through during arsenic and/or heavy metal adsorption, the surface structure is somewhat smoother (FIG. 1d), because of the re-hydration property of low temperature fired clay. Arsenic and/or heavy metal adsorption occurs at the surface of the medium, presumably including the inside surface area of the pores in the medium granules. FIGS. 1c-d compare the topographic features of unused ICPG surface with exhausted (by arsenic and/or heavy metal adsorption) ICPG at a magnification of ×1000.

ICPG can have an adsorption capacity for As(III) of, for example, between 5 mg/g and 40 mg/g. In some embodiments, the ICPG have an adsorption capacity for As(III) of 12.5 mg/g, 19.8 mg/g, and 27.1 mg/g at pH of 4.0, 7.0 and 10, respectively. The ICPG may have an adsorptive capacity for As(III) of, for example, 5.0 to 50 mg/g. In some embodiments, the ICPG have an adsorption capacity for As(III) of about 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, 14.0, 14.1, 14.2, 14.3, 14.4, 14.5, 14.6, 14.7, 14.8, 14.9, 15.0, 15.1, 15.2, 15.3, 15.4, 15.5, 15.6, 15.7, 15.8, 15.9, 16.0, 16.1, 16.2, 16.3, 16.5, 16.6, 16.7, 16.8, 16.9, 17.0, 17.1, 17.2, 17.3, 17.5, 17.6, 17.7, 17.8, 17.9, 18.1, 18.2, 18.3, 18.5, 18.6, 18.7, 18.8, 18.9, 19.0, 19.1, 19.2, 19.3, 19.5, 19.6, 19.7, 19.8, 19.9, 20.0, 20.1, 20.2, 20.3, 20.4, 20.5, 20.6, 20.7, 20.8, 20.9, 21.0, 21.1, 21.2, 21.3, 21.4, 21.5, 21.6, 21.7, 21.8, 21.9, 22.0, 22.1, 22.2, 22.3, 22.4, 22.5, 22.6, 22.7, 22.8, 22.9, 23.0, 23.1, 23.2, 23.3, 23.4, 23.5, 23.6, 23.7, 23.8, 23.9, 24.0, 24.1, 24.2, 24.3, 24.4, 24.5, 24.6, 24.7, 24.8, 24.9, 25.0, 25.1, 25.2, 25.3, 25.4, 25.5, 25.6, 25.7, 25.8, 25.9, 26.0, 26.1, 26.2, 26.3, 26.5, 26.6, 26.7, 26.8, 26.9, 27.0, 27.1, 27.2, 27.3, 27.5, 27.6, 27.7, 27.8, 27.9, 28.2, 28.2, 28.3, 28.5, 28.6, 28.7, 28.8, 28.9, 29.0, 29.1, 29.2, 29.3, 29.5, 29.6, 29.7, 29.8, 29.9, 30.0, 30.1, 30.2, 30.3, 30.4, 30.5, 30.6, 30.7, 30.8, 30.9, 31.0, 31.1, 31.2, 31.3, 31.4, 31.5, 31.6, 31.7, 31.8, 31.9, 32.0, 32.1, 32.2, 32.3, 32.4, 32.5, 32.6, 32.7, 32.8, 32.9, 33.0, 33.1, 33.2, 33.3, 33.4, 33.5, 33.6, 33.7, 33.8, 33.9, 34.0, 34.1, 34.2, 34.3, 34.4, 34.5, 34.6, 34.7, 34.8, 34.9, 35.0, 35.1, 35.2, 35.3, 35.4, 35.5, 35.6, 35.7, 35.8, 35.9, 36.0, 36.1, 36.2, 36.3, 36.5, 36.6, 36.7, 36.8, 36.9, 37.0; 37.1, 37.2, 37.3, 37.5, 37.6, 37.7, 37.8, 37.9, 38.2, 38.2, 38.3, 38.5, 38.6, 38.7, 38.8, 38.9, 39.0, 39.1, 39.2, 39.3, 39.5, 39.6, 39.7, 39.8, 39.9, 40.0, 40.1, 40.2, 40.3, 40.4, 40.5, 40.6, 40.7, 40.8, 40.9, 41.0, 41.1, 41.2, 41.3, 41.4, 41.5, 41.6, 41.7, 41.8, 41.9, 42.0, 42.1, 42.2, 42.3, 42.4, 42.5, 42.6, 42.7, 42.8, 42.9, 43.0, 43.1, 43.2, 43.3, 43.4, 43.5, 43.6, 43.7, 43.8, 43.9, 44.0, 44.1, 44.2, 44.3, 44.4, 44.5, 44.6, 44.7, 44.8, 44.9, 45.0, 45.1, 45.2, 45.3, 45.4, 45.5, 45.6, 45.7, 45.8, 45.9, 46.0, 46.1, 46.2, 46.3, 46.5, 46.6, 46.7, 46.8, 46.9, 47.0, 47.1, 47.2, 47.3, 47.5, 47.6, 47.7, 47.8, 47.9, 48.2, 48.2, 48.3, 48.5, 48.6, 48.7, 48.8, 48.9, 49.0, 49.1, 49.2, 49.3, 49.5, 49.6, 49.7, 49.8, 49.9 or 50.0 mg/g. ICPG can have an adsorption capacity for As(V) of, for example, between 10 mg/g and 80 mg/g. In some embodiments, the ICPG have an adsorption capacity for As(V) adsorption of 41 mg/g, 32 mg/g and 21 mg/g at pH of 4.0, 7.0 and 10, respectively. The ICPG may have an adsorption capacity for As(V) of, for example, between 5.0 and 50.0 mg/g. In some embodiments, the ICPG have an adsorption capacity for As(V) of 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, 14.0, 14.1, 14.2, 14.3, 14.4, 14.5, 14.6, 14.7, 14.8, 14.9, 15.0, 15.1, 15.2, 15.3, 15.4, 15.5, 15.6, 15.7, 15.8, 15.9, 16.0, 16.1, 16.2, 16.3, 16.5, 16.6, 16.7, 16.8, 16.9, 17.0, 17.1, 17.2, 17.3, 17.5, 17.6, 17.7, 17.8, 17.9, 18.1, 18.2, 18.3, 18.5, 18.6, 18.7, 18.8, 18.9, 19.0, 19.1, 19.2, 19.3, 19.5, 19.6, 19.7, 19.8, 19.9, 20.0, 20.1, 20.2, 20.3, 20.4, 20.5, 20.6, 20.7, 20.8, 20.9, 21.0, 21.1, 21.2, 21.3, 21.4, 21.5, 21.6, 21.7, 21.8, 21.9, 22.0, 22.1, 22.2, 22.3, 22.4, 22.5, 22.6, 22.7, 22.8, 22.9, 23.0, 23.1, 23.2, 23.3, 23.4, 23.5, 23.6, 23.7, 23.8, 23.9, 24.0, 24.1, 24.2, 24.3, 24.4, 24.5, 24.6, 24.7, 24.8, 24.9, 25.0, 25.1, 25.2, 25.3, 25.4, 25.5, 25.6, 25.7, 25.8, 25.9, 26.0, 26.1, 26.2, 26.3, 26.5, 26.6, 26.7, 26.8, 26.9, 27.0, 27.1, 27.2, 27.3, 27.5, 27.6, 27.7, 27.8, 27.9, 28.2, 28.2, 28.3, 28.5, 28.6, 28.7, 28.8, 28.9, 29.0, 29.1, 29.2, 29.3, 29.5, 29.6, 29.7, 29.8, 29.9, 30.0, 30.1, 30.2, 30.3, 30.4, 30.5, 30.6, 30.7, 30.8, 30.9, 31.0, 31.1, 31.2, 31.3, 31.4, 31.5, 31.6, 31.7, 31.8, 31.9, 32.0, 32.1, 32.2, 32.3, 32.4, 32.5, 32.6, 32.7, 32.8, 32.9, 33.0, 33.1, 33.2, 33.3, 33.4, 33.5, 33.6, 33.7, 33.8, 33.9, 34.0, 34.1, 34.2, 34.3, 34.4, 34.5, 34.6, 34.7, 34.8, 34.9, 35.0, 35.1, 35.2, 35.3, 35.4, 35.5, 35.6, 35.7, 35.8, 35.9, 36.0, 36.1, 36.2, 36.3, 36.5, 36.6, 36.7, 36.8, 36.9, 37.0, 37.1, 37.2, 37.3, 37.5, 37.6, 37.7, 37.8, 37.9, 38.2, 38.2, 38.3, 38.5, 38.6, 38.7, 38.8, 38.9, 39.0, 39.1, 39.2, 39.3, 39.5, 39.6, 39.7, 39.8, 39.9, 40.0, 40.1, 40.2, 40.3, 40.4, 40.5, 40.6, 40.7, 40.8, 40.9, 41.0, 41.1, 41.2, 41.3, 41.4, 41.5, 41.6, 41.7, 41.8, 41.9, 42.0, 42.1, 42.2, 42.3, 42.4, 42.5, 42.6, 42.7, 42.8, 42.9, 43.0, 43.1, 43.2, 43.3, 43.4, 43.5, 43.6, 43.7, 43.8, 43.9, 44.0, 44.1, 44.2, 44.3, 44.4, 44.5, 44.6, 44.7, 44.8, 44.9, 45.0, 45.1, 45.2, 45.3, 45.4, 45.5, 45.6, 45.7, 45.8, 45.9, 46.0, 46.1, 46.2, 46.3, 46.5, 46.6, 46.7, 46.8, 46.9, 47.0, 47.1, 47.2, 47.3, 47.5, 47.6, 47.7, 47.8, 47.9, 48.2, 48.2, 48.3, 48.5, 48.6, 48.7, 48.8, 48.9, 49.0, 49.1, 49.2, 49.3, 49.5, 49.6, 49.7, 49.8, 49.9 or 50.0 mg/g.

Figure 2:
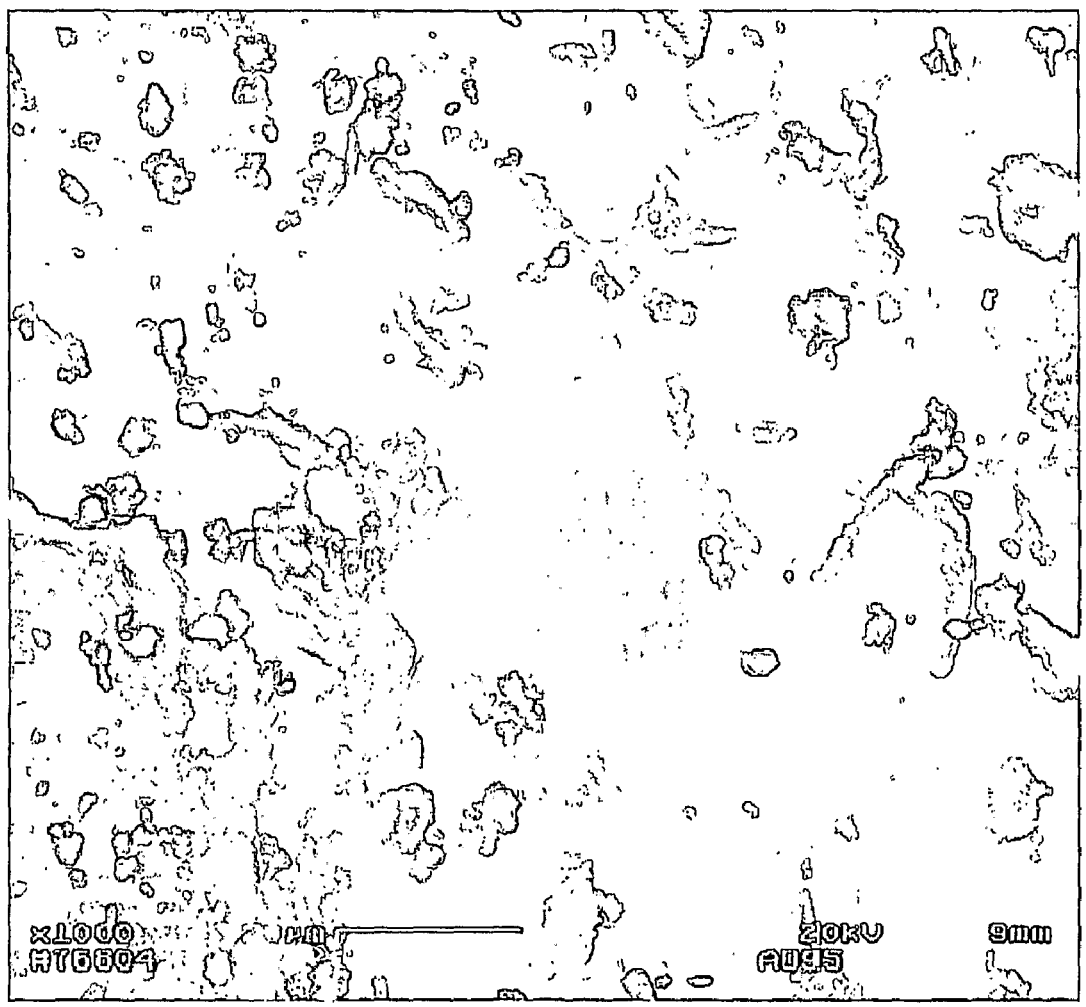
FIG. 2 depicts arsenic captured and bounded by the rough Fe—Si surface. The permeable holes also capture arsenic.

In some embodiments, the arsenic and/or heavy metal removal mechanism disclosed is based on a physical adsorption process. It does not use a chemical based process. Fe—Si surface complexes typically in the form of $FeOSi(OH)_3$ (Swedlund and Webster, 1999) have been shown to have a large adsorption capacity for both arsenate and arsenite. These have traditionally used liquid phase surface complexes. They use FeOOH and $H_4SiO_4$ to form surface complexes which adsorb both Arsenite and Arsenate in a wide range of pH (2-10) (Le Zeng, 2003, Zhang and Itoh, 2005). The high concentration of silicate present in many natural groundwaters makes the Fe—Si complex surface uncontrollable when this approach is used. In addition the silicate ion formation competes with arsenic and/or heavy metal adsorption. This instability makes the control of the production of Fe—Si surface complexes very difficult in liquid or gel medium. If the Fe—Si complex is produced in a solid phase medium, these instability problems are solved. The innovative iron coated pottery granular (ICPG) medium produces stable Fe—Si surface complexes for arsenic and/or heavy metal adsorption and is a solid phase medium (FIG. 2).

In some embodiments, a filter is used to in conjunction with the ICPG to purify water. The filter can comprise any type of container which can hold the ICPG medium. Preferably, the filter comprises a cylindrical column. A typical filter can have an empty volume of, for example, 10 to 5000 liters about In some embodiments, the filter has an empty volume of 10, 50, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, 2000, 2500, 3000, 3500, 4000, 4500 or 5000 liters. In some embodiments, the filter has an empty volume of about 1.2 liters. The filter is filled with, for example, 100 to 900 g of ICPG medium. In some embodiments, the filter is filled with about 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890 or 900 g of ICPG granular medium. The filter may be filled with, for example, between 1.0 and 10 kg of ICPG granular medium. In some embodiments, the filter is filled with, for example, about 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9 or 10 kg of ICPG granular medium. In some embodiments, the filter is filled with between 500 g and 1 kg of ICPG medium. In a preferred embodiment, the filter is filled with about 750 grams of ICPG. In some embodiments, the filter is filled with 750 grams of ICPG granular medium. In a preferred embodiment, the filter unit is a portable up-flow column filter.

In some embodiments, when treating drinking water containing arsenic and/or heavy metal concentrations of about 300 ppb or less, the filter produces about 115 liters of water per day at an arsenic and/or heavy metal content below 10 ppb or and 210 liters/day with arsenic and/or heavy metal content below 50 ppb. The filter may produce, for example, about 50 to 1000 liter/day. In some embodiments, the filter produces about 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 325, 320, 325, 330, 335, 340, 345, 350, 355, 360, 365, 370, 375, 380, 385, 390, 395, 400, 405, 410, 425, 420, 425, 430, 435, 440, 445, 450, 455, 460, 465, 470, 475, 480, 485, 490, 495, 500, 505, 510, 525, 520, 525, 530, 535, 540, 545, 550, 555, 560, 565, 570, 575, 580, 585, 590, 595, 600, 605, 610, 625, 620, 625, 630, 635, 640, 645, 650, 655, 660, 665, 670, 675, 680, 685, 690, 695, 700, 705, 710, 725, 720, 725, 730, 735, 740, 745, 750, 755, 760, 765, 770, 775, 780, 785, 790, 795, 800, 805, 810, 825, 820, 825, 830, 835, 840, 845, 850, 855, 860, 865, 870, 875, 880, 885, 890, 895, 900, 905, 910, 925, 920, 925, 930, 935, 940, 945, 950, 955, 960, 965, 970, 975, 980, 985, 990, 995 or 1000 liters/day.

In some embodiments, the filter is an up-flow column filter. In some embodiments, the filter produces about 115 liters of water per day at an arsenic and/or heavy metal content below about 10 ppb and/or about 210 liter water/day with arsenic and/or heavy metal content below about 50 ppb. The filter may produce water having an arsenic and/or heavy metal content of about 1 to 50 ppb. In some embodiments, the filter produces water having an arsenic and/or heavy metal content of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42 43, 44, 45, 46, 47, 48, 49 or 50 ppb.

The ICPG medium can be used in a wide variety of different drinking water filtration systems. In some embodiments, the ICPG medium is applied to POU filtration systems, such as, for example, a small volume water filtration system for a single family home. In other embodiments, the ICPG medium is applied to large volume water treatment processes, such as, for example, a drinking water plant. In another embodiment, the ICPG medium is useful for treating industrial wastewater. In another embodiment, the ICPG medium is useful for arsenic and/or heavy metal-containing hazard material storage. The ICPG medium is useful for removal of bacteria from drinking water in addition to arsenic and heavy metals.

All the materials needed for making ICPG are available locally in South Asia, and they are less expensive there than in the United States. As discussed above, the main raw materials used in manufacturing the ICPG are clay and iron powders. The manufacturing process uses regular ceramic kilns with automatic controllable firing. In some embodiments, a Cone 10 kiln with automatic firing and a temperature controller and industrial sieves is used.

The components used in making porous pottery granules are summarized in Table III below. To prepare the porous pottery granules, ten kilograms (kg) clay (kaolinite) powder was combined with five kg flour in a dry mix for five to ten minutes. One gallon of liquid wax was combined with one gallon of water. The water-wax mix was gradually added to the dry mix of clay powder and flour by spraying into the dry mix while continuously mixing the clay-flour mixture over a twenty-minute time period, thereby resulting in a wet granule mixture. The wet granule mixture was placed in an iron bucket, which is placed in the kiln. The firing process was controlled under anoxic conditions. The kiln was set to and held at 110° C. (230° F.) for two hours. Subsequently, the kiln was heated to 630° C. (1166° F.) and held for three hours at a heat rate of 194° F. per hour. The kiln was then cooled down. Once the kiln had cooled, the porous pottery granules were ready for making ICPG.

TABLE III

Recipe for Porous Pottery Granules

| Material for porous granules | | weight | percentage actual | possible range | alternative materials | source |
|---|---|---|---|---|---|---|
| Dry powders | kaolinite (kg) | 10 | 65% | 30%-90% | The Kaolinite Group including kaolinite, dickite and nacrite; and The Montmorillonite Smectite Group including pyrophyllite, talc, vermiculite, sauconite, saponite, nontronite and montmorillonite | Commercially available in clay market |
|  | flour or starch | 5 | 33% | 10%-70% | wood powders, coconut powders, sugar | Flour is widely commercially available in grocery stores |
| total | | 15 | 100% | | | |
| Liquid for sprayer | Wax or cooking oil (gallon) | 1 | | | Cooking oil, bee wax, paraffin, animal oil | Widely commercially available |

There are no harmful chemical processes used in the production of ICPG. There are no special requirements for the plastic water container used as the water reservoir, and such containers are currently available in various parts of the world. To reduce the farmer's cost and the shipping cost, containers can be obtained from local manufacturers. Furthermore, there are no environmentally harmful by-products produced in the process.

The following examples are by way of illustration and not by way of limitation.

EXAMPLE 1

Preparation of Porous Pottery Granules

This Example illustrates the preparation of porous pottery granules, which may be used in the preparation of ICPG (see Example 2 below).

EXAMPLE 2

Preparation and Use of Iron Coated Pottery Granules (ICPG, MicroNose™)

This Example illustrates the preparation of ICPG, and use of ICPG for removal of heavy metal and arsenic from drinking water.

ICPG medium was made of highly porous pottery that is coated with zero-valent iron powder. It is a highly permeable and adsorptive barrier. The ICPG medium was prepared from high porosity pottery granules prepared as described in Example 1. The porous granules were screened with a commercially available screening device selecting granules for iron coating: porous granules were selected for size using a mesh screening device comprising several layers of various-sized screens, e.g. 40 mesh, 16 mesh, 8 mesh, 6 mesh. This provided granules sized between 40-16 mesh, 16-8 mesh, 8-6 mesh. 10 kg of the selected granules were placed in a rounded granule mixer. While being mixed, the granules were gradually sprayed with 1 liter of water to re-hydrate the granules. The re-hydration process took place over twenty minutes. 33% w/w zero-valent iron powder, size passed through a 200 mesh screen, was added to the granules with constant agitation. The granules were mixed with the iron powder for about 15 to 20 minutes and placed into an iron bottle or bucket. The granules were fired for 3-5 hours at 550-680° C. under anoxic conditions. The Fe—Si solid phase surface complexes formed during this firing process. Characteristic of re-hybridized pottery, the strength of the granules was increased by this firing process.

The ICPG granular size was less than 2.36 mm. The porosity was 75-80% and the specific surface area of medium pre-coating and after coating were 212 $m^2/g$ and 40 $m^2/g$, respectively. The pH of ICPG (40% ICPG and 60% water) was 7.1.

As shown in FIG. 1a, the typical ICPG granule (1-2.36 mm diameter) contains many holes in size of 10-20 μm (FIGS. 1b and 2). The total pore volume is 0.28 cc/g. This makes them water permeable. The ICPG granule features a rough surface and permeable holes, and does not disintegrate in water. At the surface of ICPG granules, iron and clay material form a rough surface structure where arsenic ions and/or heavy metal ions will be adsorbed (FIG. 2). After arsenic and/or heavy metal adsorption, the surface structure is smoother. The water flow and arsenic and/or heavy metal adsorption take place on the surface of the medium and the inside surface area of the holes in the medium. FIG. 1c-d is a topographic comparison between the unused ICPG surface and exhausted (by arsenic adsorption) ICPG at a magnification of 1000.

The ICPG granules have been tested at the University of Hawaii in both batch reactor and column filter configurations for arsenic adsorptive capacity and arsenic removal. Hawaii groundwater spiked with arsenic was used for testing. Ptests showed that the ICPG had an adsorption capacity for As(III) of 12.5 mg/g, 19.8 mg/g, and 27.1 mg/g at pH of 4.0, 7.0 and 10, respectively. For arsenate (AsV) adsorption, ICPG had capacities of 41 mg/g, 32 mg/g and 21 mg/g at pH of 4.0, 7.0 and 10, respectively.

The ICPG filter product has been tested at the University of Hawaii. The filter has a 1.2 liter empty volume and was filled with 750 g of ICPG medium (granular size less than 2.36 mm). After filling, the filter has a usable volume of 650 ml. Hawaii groundwater dosed with high arsenic content was used for testing. The total arsenic concentration of the test water was in the range of 295-321 ppb with 50% arsenate (sodium arsenate) and 50% of arsenite (Sodium arsenite). The pH value of the test groundwater was in the range of 6.8-7.5.

The empty bed contact time (EBCT) affects the effluent quality. The EBCT for effluent meeting the 10 ppb MCL, 50 ppb MCL are 13 minutes and 3.8 minutes, respectively. In the test, stability was achieved when EBCT was greater than 3 minutes and/or when flowrate was less than 15 liter/hour. When the system was operated at 13 minutes EBCT (flowrate at 3.7 liter/hour), in the effluent, residual arsenic concentration was between 5-8 ppb. When EBCT was kept at 4.0 minute (flowrate of 12 liter/hour), the arsenic concentration was between 32 ppb and 42 ppb. The system was able to treat 14,000 liters until it reached the break through quantity at which filter medium replacement became necessary.

Figure 3:
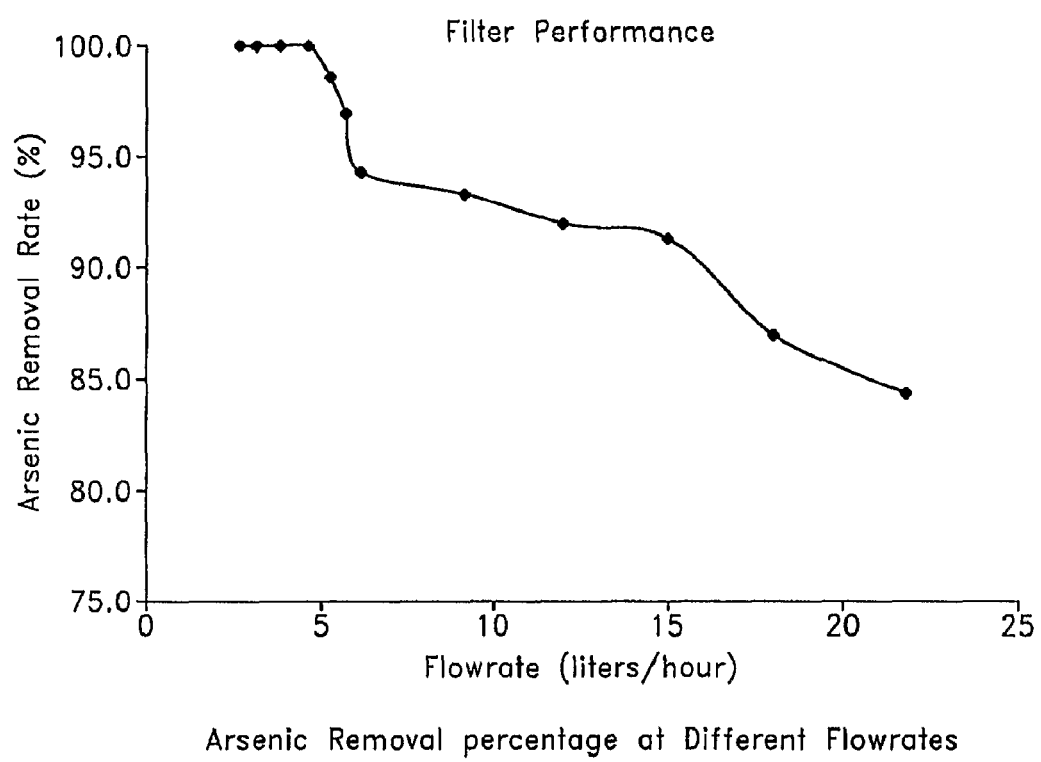
FIG. 3 depicts the effect of flow rate on arsenic removal rate.

The performance of the ICPG filter is shown in FIG. 3. When the filtration flow rate was controlled at less than 5 liter/hour, the arsenic in the effluent was almost undetectable. When the flow rate was controlled below 10 liter/hour, arsenic removal was on average 92%. Performance of the ICPG system is summarized in Table IV.

TABLE IV

Laboratory Up-flow Column Filter Performance Data and Analysis

| | | | | | | | | | | | | |
|---|---|---|---|---|---|---|---|---|---|---|---|---|
| Flowrates (liter/hour) | 1.8 | 2.1 | 2.55 | 3.1 | 3.5 | 3.8 | 4.1 | 6.1 | 8 | 10 | 12 | 14.5 |
| Empty bed contact time(minutes) | 26.7 | 22.9 | 18.8 | 15.5 | 13.7 | 12.6 | 11.7 | 7.9 | 6.0 | 4.8 | 4.0 | 3.3 |
| Effluent Residual Arsenic (ug/l or ppb) | 0 | 0 | 0 | 0 | 4 | 9 | 17 | 20 | 27 | 26 | 39 | 47* |
| Arsenic Removal rate (%) | 100.0 | 100.0 | 100.0 | 100.0 | 98.7 | 97.0 | 94.3 | 93.3 | 91.0 | 91.3 | 87.0 | 84.3 |
| Effluent Fe concentration (ppb) | 151 | 78.1 | 21 | 5 | 5 | 6 | 7 | 74 | 58 | 100 | 121 | 145 |

Note:
When flowrates was more than 15 liter/hour that resulting EBCT less than 3 minute, the system was not stable.

The possible effects on other water quality have been monitored throughout the column filter testing by analysis of Fe and Al concentration, which are possible problems that ICPG may cause. It was found that almost no Al was leached from the medium after 5 days operation; the Fe leach is also very little if the water has no iron content. However, if the water contains high Fe ion, there will be no leaching from medium and instead the medium can absorb some iron from the water.

Arsenic appears to be tightly adsorbed by the medium. Little arsenic was flashed out when the exhausted medium was flashed by distilled water. If acid solution (e.g. 5% $H_2SO_4$) is used, the arsenic can be washed out to the level of 65%.

The filter has been operated continuously to purify sample groundwater. With a flowrate in the range of 4.5-5 liter/hour (108-120 liter/day), residual arsenic was less than 10 ppb. When the flowrate was increased to 10 liter/hour (240 liter/day), the residual arsenic in the effluent was in the range of 15-32 ppb. The inorganic element concentrations of the test water were analyzed by Agricultural Diagnostic Service Center (ADSC) using the inductively coupled plasma (ICP) method. An example testing result is depicted in Table V.

A test of 15,000 liters of groundwater with arsenate and arsenate dosage was conducted. The average removal efficiency was greater than 95% when the EBCT was controlled at fifteen minutes. The ICPG filter system did not require any chemical makeup, electricity or backwash, and there were no secondary effects on other water qualities. Analysis of the exhausted medium shows immobilization of arsenic.

the influent and effluent are shown in Table V below. The removal rates of different metals are calculated and listed in the table. The results clearly indicate that ICPG has the ability to simultaneously remove various heavy metals from a mixed solution.

TABLE V

Water Sample Analyses Worksheet

| | Sample | | Anal. | ug/ml | | | | | | | ug/ml | | |
|---|---|---|---|---|---|---|---|---|---|---|---|---|---|
| Item | Lab No. | Desc. | Code | P | K | Ca | Mg | Na | Fe | Mn | Zn | Cu | B |
| 1 | 061-0843 | Filtration Influent | W2, 3, 4 | 0.10 | 4.84 | 20.39 | 20.72 | 50.44 | 0.01 | 0.16 | 0.01 | 0.03 | 0.03 |
| 2 | 061-0844 | Filtration Effluent | | 0.07 | 3.16 | 17.97 | 16.73 | 43.90 | 0.02 | 0.02 | 0.00 | 0.01 | 0.03 |
| 3 | 061-0846 | Capacity BF | | 6.31 | 2064 | 2.24 | 4.51 | 2091 | 0.32 | 896.2 | 1.45 | 345.4 | 0.15 |
| 4 | 061-0845 | Capacity AF | | 1.13 | 1152 | 6.33 | 7.59 | 1802 | 0.07 | 535.8 | 0.28 | 0.10 | 0.13 |
| 5 | | Capacity (mg/g) | | 0.017 | 2.995 | −0.013 | 0.0010 | 0.949 | 0.001 | 1.184 | 0.004 | 1.134 | 0.000 |
| 6 | | AF is after filtration | | | | | | | | | | | |
| 7 | | BF is before filtration | | | | | | | | | | | |

| | | | | ug/ml | | | | | | | | | |
|---|---|---|---|---|---|---|---|---|---|---|---|---|---|
| | | | Item | Mo | Ag | As | Cd | Co | Cr | Ni | Pb | Se | NO3-N |
| | | | 1 | 0.01 | 0.10 | 0.03 | 0.01 | 0.05 | 0.17 | 0.05 | 0.01 | 0.06 | 1.15 |
| | | | 2 | 0.01 | 0.02 | 0.00 | 0.00 | 0.00 | 0.01 | 0.01 | 0.00 | 0.01 | 1.46 |
| | | | 3 | 0.17 | 1.08 | 10.41 | 0.17 | 223.8 | 688.0 | 270.3 | 1.00 | 290.9 | 500.87 |
| | | | 4 | 0.08 | 0.20 | 0.54 | 0.03 | 57.09 | 283.2 | 49.21 | 0.27 | 271.6 | 460.31 |
| | | | 5 | 0.000 | 0.003 | 0.032 | 0.000 | 0.547 | 1.329 | 0.726 | 0.002 | 0.063 | 1.352 |
| | | | 6 | | | | | | | | | 5.03 | |
| | | | 7 | | | | | | | | | | |

There was no need for chemical dosage or other physical adjustments during the testing period.

EXAMPLE 3

Removal of Heavy Metals From Water Using ICPG (MicroNose™)

The ICPG medium satisfied the requirements of a column adsorbent for arsenic removal: (1) sufficient strength and large surface area to allow granular packing; (2) efficient removal of both As(V) and As(III); (3) long duration, high capacity, selectivity, and high rate of adsorption; (4) high physical strength (not disintegrating) in water, (5) short hydraulic retention time (HRT) produced by high porosity and (6) limited secondary problems affecting the quality of water.

The ICPG granules have been tested at the University of Hawaii in both batch reactor and column filter configurations for heavy metal adsorptive capacity and heavy metal removal. To create a test water solution, $HgSO_4$, $KNO_3$, $Ag_2SO_4$, $ZI(OH)_2$, $Mn(SO_4) \cdot H_2O$, $Mn(SO_4)$, $Na_2SeO_4 \cdot 10H_2O$, $NiCl_2$, $K_2Cr_2O_7$, $CoCl \cdot _6H_2O$, $CuSO_4 \cdot 5H_2O$, $NaF$, $NaAsO_2$, and $Na_2AsO_4$, were dissolved in to 1 liter Dl water. The solution was filtered to remove insoluble material, and the filtrate liquid containing heavy metals and other ions was used as solution for both column filtration and capacity testing.

The test water solution described and tap water was used as a filtration influent. The filtration EBCT was controlled at 15 minutes. The concentration of heavy metals and other ions in

EXAMPLE 4

Installation and Set-up of Basic Filtration System

This Example illustrates the installation and set-up of a basic ICPG filtration system.

Preferably, installation of a basic filtration system is simple, requiring no chemical solutions and essentially no training. Use of a simple gravity-feed design eliminates the need for any electrical connection.

The ICPG filter components are listed in Table VI. There is no special tool or skill required for a person to set up the filter.

TABLE VI

Components List for ICPG Filter

| Component | Material | Weight | Size | Quantity |
|---|---|---|---|---|
| Bucket | Plastic | 1000 g | 5 gallon | 1 |
| Bucket valve | Plastic | | ½ inch | 1 |
| Bucket cover | Plastic | | | 1 |
| Cartridge | Clear PVC | 1600 g (750 g medium included) | 2 inch diameter, 26 inches length | 1 |
| Cartridge holder | Metal | | | |
| Clips for cartridge | Metal | | | 1 |
| Water Tube | Clear plastic | 100 g | ½ inch inside diameter/6 feet | 2 |

Note:
Bucket and its fitting are optional if a householder has a water reservoir with control valve.

Requirements for set-up: The system is a stand-alone design. No tools are required for set up if the filter cartridge is installed on a ground stand. The cartridge can also be installed using a wall mounted hanger. This installation requires only a harmer or a screw driver. A typical owner with minimal skills and training can install the system in five minutes.

Determine whether the filter cartridge will be wall mounted or ground mounted.

For wall mounted units a hammer or screwdriver is used to fix mounting clips to the wall.

Put the bucket on a chair or any holder that is strong enough to support the 25 kg bucket. The outlet of the bucket should be positioned 40 cm above the top of cartridge. If a water reservoir exists with a control valve, then directly connect the tube to it.

Connect the outlet of the bucket valve to the bottom of the cartridge and connect the upper cartridge outlet to your purified water storage container.

Fill the bucket with water and open the valve. The water should be allowed to flow freely for 50 minutes to perform a pre-wash. After the pre-wash the filter is ready to use. Pre-wash water is sometimes black in color because of carbon ash. The pre-wash water is safe for discharge.

EXAMPLE 5

Operation Menu for the Basic ICPG Filtration System

This Example illustrates the operation of a basic ICPG filtration system.

Pre-Wash after Set-Up. When set-up procedures are finished, the filter is pre-washed with 12 liter water, because carbon ash or small granules failings may be generated by shaking during transportation.

After pre-wash, fill bucket with the water to be treated and cover the bucket to prevent dust and bacteria from falling in. Turn valve to the widest open position, this produces water at 10 liter/hour.

To produce filtered water with arsenic less than 10 ppb, the controlled valve should be turned to position 2 (indicated in marking on valve). This produces a flow rate 5 liter/hours.

Calculate householder's daily water consumption, then estimate the date that cartridge should be replaced and mark the date on the cartridge:

Cartridge lifespan in days=13,500 liters/liters filtered per day, While filter cartridge maximum capacity is 14,000 liters, 13,500 liters is recommend for safer operation.

For a family of 7 people, a simple method to determine the cartridge replacement is to replace the cartridges every six month or after 600 buckets of water are filtered.

No backwash is needed because of the upflow design, unless the influent water had high suspended solids.

EXAMPLE 6

Maintenance Protocol for the Basic ICPG Filtration System

This Example illustrates the operation of a basic ICPG filtration system.

The filter is designed as an upflow type; usually there is no clogging problem if the suspended solids are low. However, if the suspended solid concentration is higher than 20 ppm or large granules are introduced into the filter, they may cause clogging at the bottom screen. The user can clear clogs by unplugging the inlet tube, letting the water release and clean the granules.

The holding bucket should always remain covered to avoid secondary pollution. Likewise, the user should clean the bucket weekly if the filter is used outdoors.

During the operation process the medium may change color to red or brown. This is a normal phenomenon and will not affect the treatment efficiency. This is caused by oxidation of iron when oxygen is present in the water.

During pre-wash procedure, if air bubbles are presents in the plastic tube, they can be released into the bucket by pressing on the tube. Even in the pre-wash period, it is preferable to use upflow, which is release the air inside and between the medium particles. Air bubbles in the cartridge will affect the flowrate and mixing conditions.

EXAMPLE 7

Mechanism

ICPG Filtration Process

This Example illustrates the mechanism behind the ICPG filtration process.

FIG. 7 shows an embodiment of a system that can be used to perform a variety of methods or procedures. In some embodiments, a basic iron-coated pottery granular (ICPG) filled column is used to purify a fluid. Water from a reservoir passes by up-flow through the ICPG column by gravity hydraulic pressure.

The carbon and porosity of the ICPG provide a large surface area to attract arsenic ions and heavy metal ions. In addition, iron acts as an electron donor to adsorb the arsenic. The Fe—Si complex, which is a silica gel, blocks arsenic release. The Fe—Si surface complex coating the ICPG binds and immobilizes arsenic. Large bacteria are also trapped in the column.

EXAMPLE 8

Synchotron-Based X-Ray Apsorption Fine Structure Measurements

Concentration of the arsenic in groundwater ranges from 10 ppm to as high as several hundred ppm. At very low concentrations, sensitive element-specific probes capable of providing electronic structure and local atomic information on As, Si, and Fe, respectively are useful for understanding the absorption mechanism of As (III) and As (V) in the ICPG. Synchrotron-based x-ray absorption fine structure (XAFS) spectroscopy methods are well suited for this type of work because of the extremely-high intensity of synchrotron x-rays and their energy tunability, which provide not only elemental sensitivity to 10 ppm or below (Higgins and Huffman 1996) but also elemental specificity (valence, bond distance, coordination number and the ligand type).(Brown, Foster et al. 1999; Higgins and Huffman 1996).

XAFS spectroscopy consists of XANES (x-ray absorption near-edge structure) and EXAFS (extended x-ray absorption fine structure). XANES is employed to detect the oxidation state of selected element, while EXAFS is for determining the near-neighbor distances and coordination numbers of selected element. These techniques have been successfully used to characterize the nature of arsenic in coals (Higgins and Huffman 1996; Higgins, Shah et al. 1993), in contaminated soils and weathered mining tailings (Arcon, van Elteren et al. 2005; Foster, Brown et al. 1998b), in kaolinite and anatase (Foster, Brown et al. 1998a), during oxidation of Fe(II)-As (III) solution (Thoral, J. Rose et al. 2005), on hydrous Mn (Foster, Brown et al. 2003), at aluminum oxide-water interface (Arai, Elzing a et al. 2001), and in allophane-water interface (Arai, Sparks et al. 2005). It is, therefore, useful to carry out XANES and EXAFS measurements using extremely high-intensity and high-flux synchrotron radiation available to the general users at the Advanced Photon Source (APS) at Argonne National Laboratory or at the National Synchrotron Light Source (NSLS) at Brookhaven National Laboratory.

The sample preparation and experimental procedures for XAFS measurements are similar to those described earlier (Higgins, Goodarzi et al. 1996; Higgins and Huffman 1996). For in-situ measurements, the XAFS spectra are collected in fluorescence mode at the geometry of 90° to incident x-ray, and the liquid sample is encapsulated by a kapton window and ICPG sample wall. XAFS measurements are done with ICPG specimens after the filter medium is tested under different conditions such as pH value, flow rate, initial As(II)/As(V) concentration, redox state, salinity, with competing species, etc.

EXAMPLE 9

X-Ray Diffraction Measurements

X-ray diffraction can provide additional information on the crystalline phases including the amorphous phase of the filter materials after each testing. In the removal of As(III) from groundwater by nanoscale zero-valent iron. XRD measurements are useful in identification of amorphous iron(III) oxide/hydroxide, magnetite ($Fe_3O_4$), and/or maghemiteand lepidocrocite (FeOOH) (Kanel, Manning et al. 2005). XRD measurements are conducted using x-ray diffractometersd synchrotron sources.

EXAMPLE 10

Scanning Electron Microscope

Samples of uncoated and iron coated pottery granules are examined by scanning electron microscopy (digital Zeiss DSM962, equipped with an Oxford Link energy dispersive x-ray spectrometry system), before and after flushing with variable volumes of experimental water, in order to observe physical effects of flushing on the topographic features of the ICPG. This is performed in close coordination with the AFM studies (below).

EXAMPLE 11

Atomic Force Microscopy

AFM has been proven to be very effective mean in studying surface nanostructures and it has an advantage over scanning electron microscopy, because dynamical processes such as a crystal growth in liquid can be imaged with nanometer resolution (Dai, Nekrassova et al. 2004; Land, Malkin et al. 1995). SEM images and visual observation of the corrosion on the ICPG columns suggest that a thin film (similar to that observed on steel surface due to inhibitor (Luo, Guan et al. 1998; Mu and Li 2005; Olivares-Xometl, Likhanova et al. 2006) is formed on the ICPG granule surface. This film can play an important role in the absorption of As and in protecting zerovalent iron from corrosion. PLS-ICPG consists of substrate covered by thin (100-200 μm) clay and Fe(0) thin (10100 μm) layers. Two kinds of the Fe(0) layers can be deposited. A clay sample completely coated by F(0) is used to study an As absorption on pure F(0) system and for comparison with data obtained with partially coated clay. Zero-valent (F(0)) strips with various thicknesses and widths can also be deposited on the second kind of PLS-ICPG.

EXAMPLE 12

Arsenic Analysis

Routine analysis of As is done by ICP Water samples are directly analyzed within 3 hours of collection, remaining at 4° C. up to analysis. As associated with clay or medium samples is analyzed by following Standard Methods for the Examination of Water and Wastewater (Standard Methods for the Examination of Water and Wastewater, 21st Edition, American Public Health Association (APHA), American Water Works Association (AWWA) & Water Environment Federation (WEF) (2005). Washington, the entire text of which is incorporated by reference in its entirety). Samples are pre-digested with $HNO_3$.

EXAMPLE 13

Arsenic Speciation

Arsenic speciation analysis is performed using high performance liquid chromatography (HPLC) with inductively coupled mass spectrometry (ICP-MS) detection ((Day, Montes-Bayon et al. 2002; Francesconi and Kuehnelt 2004). HPLC-ICP-MS is a robust, rapid and sensitive technique for the detection and quantification of inorganic and organic aqueous species of As (B'Hymer and Caruso 2004; Falk and Emons 2000; Francesconi and Kuehnelt 2004; Leermakers, Baeyens et al. 2006); for example, with detection limits as low as <0.1 ppb for As(III), As(V), monomethylated and dimethylated As species (Day, Montes-Bayon et al. 2002). Recovery of key arsenic species from the HPLC column is tested using certified standard reference material (Francesconi and Kuehnelt 2004; Gong, Lu et al. 2002b; Yu, Cai et al. 2003). The user follows U.S. EPA specifications (EPA) for analytical procedures and utilizes certified reference materials. Samples for speciation analysis are collected in opaque bottles and some preserved with EDTA (plus duplicate unpreserved) to minimize changes in speciation due to photochemical oxidation, oxyhydroxide precipitation (e.g., as in Fe-rich water), or redox reactions (e.g., oxidation of As(III), to As(V)) between time of collection and analysis (Bednar, Garbarino et al. 2002a; Gallagher, Schwegel et al. 2001); when possible samples are analyzed immediately—same day (Gong, Lu et al. 2001; Gong, Lu et al. 2002b; Kim 2001; Pizarro, Gomez et al. 2003; Raessler, Michalke et al. 2000).

POC and PON concentrations: Samples are filtered onto pre-combusted GF filters and analyzed using a Thermoquest/CE Instr. Automated elemental analyzer.

DOC concentrations, characterization: determined by high temperature platinum catalytic oxidation using a Shimadzti Total Organic Carbon Analyzer with autosampler.

EXAMPLE 14

Transport and Disposal of ICPG-bound As

Arsenic-saturated ICPG cartridges contain high levels of particulate arsenic. A characteristic of a superior solution for As-contamination is the stability and safe transport of the ICPG cartridge. The cartridge itself is made of inexpensive but robust materials that transport well. The bond stability of the As-ICPG complex can be tested under variable environmental conditions as described above (Section 3.2.2) following storage for up to at least two years.

EXAMPLE 15

Iterative Fine-Scale Engineering of ICPG Medium and Application Methods

Some embodiments employ mixed size (0.85-2.36 mm) ICPG granules. However, the granule size impacts the adsorption capacity and medium-column operation performance. In general, adsorption capacity increases with increasingly smaller granule size; however, cartridges packed with ICPG with diameters less than 0.25 mm quickly become inoperable due to clogging. In order to optimize granule size, a compromise between As removal efficiency and flow characteristics takes into account As-removal kinetics and geochemistry series experiments using different granule sizes (1.18-2.36 mm, 0.85-1.18 mm, 0.60-0.85 mm, 0.425-0.60 mm, 0.25-0.425 mm and mixed sizes).

The methods, procedures, and devices described herein are presently representative of preferred embodiments and are exemplary and are not intended as limitations on the scope of the invention. Changes therein and other uses will occur to those skilled in the art which are encompassed within the spirit of the invention and are defined by the scope of the disclosure. All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that can vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

It will be apparent to one skilled in the art that varying substitutions and modifications can be made to the invention disclosed herein without departing from the scope and spirit of the invention.

Those skilled in the art recognize that the aspects and embodiments of the invention set forth herein can be practiced separate from each other or in conjunction with each other. Therefore, combinations of separate embodiments are within the scope of the invention as disclosed herein.

REFERENCES

Ahmed, F., K. Minnatullah and A Talbi (2006). Paper III. Arsenic Mitigation Technologies in South and East Asia Toward a More Effective Operational Response. Arsenic Contamination in Ground Water in South and East Asian Countries, The World Bank. II. Technical Report. Report No. 31303.

Amend, J. P. and E. L. Shock (2001). "Energetics of overall metabolic reactions of thermophilic and hyperthermophilic Archaea and Bacteria." Fems Microbiology Reviews 25(2): 175243.

Amy, G. L., M. Edwards, M. Benjamin, K. Carlson, J. Chwirka, et al., Eds. (1998). AWWARF (1998). Arsenic Treatability Options and Evaluation of Residuals Management Issues.

Anderson, L. C. D. and K. W. Bruland (1991). "Biogeochemistry of arsenic in natural waters: the importance of methylated species." Environmental Science & Technology 25(3): 420-427.

Arai, Y., E. J. Elzing a and D. L. Sparks (2001). "X-ray Absorption Spectroscopic Investigation of Arsenite and Arsenate Adsorption at the Aluminum Oxide-Water Interface." Journal of Colloid and Interface Science 235(1): 80-88.

Arai, Y., D. L. Sparks and J. A. Davis (2005). "Arsenate adsorption mechanisms at the allophane-water interface." Environmental Science & Technology 39(8): 2537-2544.

Arcon, L., J. T. van Elteren, H. J. Glass, A. Kodre and Z. Slejkovec (2005). "EXAFS and XANES study of arsenic in contaminated soil." X-Ray Spectrometry 34(5): 435-438.

B'Hymer, C. and J. A. Caruso (2004). "Arsenic and its speciation analysis using high-performance liquid chromatography and inductively coupled plasma mass spectrometry." Journal of Chromatography A 1045(1-2): 1-13.

Bailey, S. W. (1988). "Odinite, a new dioctahedral-trioctahedral Fe-rich 1:1 clay mineral." Clay Minerals 23(3): 237-247.

Bang, S., M. D. Johnson, G. P. Korfiatis and X. G. Meng (2005). "Chemical reactions between arsenic and zero-valent iron in water." Water Research 39(5): 763-770.

Bang, S., G. P. Korfiatis and X. G. Meng (2005). "Removal of arsenic from water by zero-valent iron." Journal of Hazardous Materials 121(1-3): 61-67.

Bednar, A. J., J. R. Garbarino, J. F. Ranville and T. R. Wildeman (2002a). "Preserving the distribution of inorganic arsenic species in groundwater and acid mine drainage samples." Environmental Science & Technology 36(10): 2213-2218.

Bednar, A. J., J. R. Garbarino, J. F. Ranville and T. R. Wildeman (2002b). "Preserving the distribution of inorganic arsenic species in groundwater and acid mine drainage samples." Environmental Science and Technology 36(10): 2213-2218.

Beghi, M. G., A. G. Every and P. V. Zinin (2004). Brillouin Scattering Measurement of SAW Velocities for Determining Near-Surface Elastic Properties. Ultrasonic Nondestructive Evaluation: Engineering and Biological Material Characterization. T. Kundu. Boca Raton, CRC Press: 581-651.

Brown, G. E., A. L. Foster and J. D. Ostergren (1999). "Mineral surfaces and bioavailability of heavy metals: A molecular-scale perspective." Proceedings of the National Academy of Sciences of the United States of America 96(7): 3388-3395.

Casiot, C., V. Pedron, O. Bruneel, R. Duran, J. C. Personne, et al. "A new bacterial strain mediating As oxidation in the Fe-rich biofilm naturally growing in a groundwater Fe treatment pilot unit." Chemosphere In Press, Corrected Proof Cheng, R. C., H. C. Wang and M. D. Beuhler (1994). "Enhanced Coagulation for Arsenic Removal." Journal American Water Works Association 86(9): 79-90.

Conway, B. E. (1995). "Electrochemical Oxide Film Formation at Noble-Metals as a Surface-Chemical Process." Progress in Surface Science 49(4): 331-452.

Cowen, J. P. (2004). "The microbial biosphere of sediment-buried oceanic basement." Research in Microbiology 155(7): 497-506.

Cowen, J. P. and C. German (2003). Biogeochemical Cycling in Hydrothermal Plumes; In: Energy and Mass Transfer in Marine Hydrothermal Systems. P. E. Halbach, V. Tunnicliffe and J. R. Hein. Dahlem Dahlem University Press: 23-45.

Cowen, J. P., S. J. Giovannoni, F. Kenig, H. P. Johnson, D. Butterfield, et al. (2003). "Fluids from aging ocean crust that support microbial life." *Science* 299(5603): 120-123.

Cullen, W. R. and K. J. Reimer (1989). "Arsenic speciation in the environment." *Chem. Rev.* 89:713-764.

Dai, X., O, Nekrassova, M. E. Hyde and R. G. Compton (2004). "Anodic stripping voltammetry of arsenic(III) using gold nanoparticle-modified electrodes." *Analytical Chemistry* 76(19):5924-5929.

Daus, B., R. Wennrich and H. Weiss (2004). "Sorption materials for arsenic removal from water: a comparative study." Water Research 38(12): 2948-2954.

Day, J. A., M. M. Montes-Bayon, A. P. Vonderheide and 1. A. Caruso (2002). "A study of method robustness for arsenic speciation in drinking water samples by anion exchange HPLC-ICP-MS." *Analytical and Bioanalytical Chemistry* 373(7): 664-668.

Decarreau, A., D. Bonnin, D. Badaut-Trauth and R. Couty (1987). "Synthesis and crystallogenesis of ferric smectite by evolution of Si—Fe coprecipitates in oxidizing conditions." *Clay Minerals* 22(2): 207-223.

Dore, J. E. and D. M. Karl (1996). "Nitrification in the euphotic zone as a source for nitrite, nitrate, and nitrous oxide at Station ALOHA." *Limnology and Oceanography* 41(8): 1619-1628. EP A (2000). *Technologies and costs for removal of arsenic from drinking water.* EPA. (2006). "Arsenic in Drinking Water", from http://www.epa.gov/_safewater/arsenic/index.html.

Falk, K. and H. Emons (2000). "Speciation of arsenic compounds by ion-exchange HPLC-ICP-MS with different nebulizers." *Journal of Analytical Atomic Spectrometry* 15(6): 643-649.

Farrell, J., J. Wang, P. O'Day and M. Conklin (2001). "Electrochemical and spectroscopic study of arsenate removal from water using zero-valent iron media." *Environmental Science & Technology* 35(10): 2026-2032.

Floroiu, R. M., A. P. Davis and A. Torrents (2004). "Kinetics and Mechanism of As2S3(am) Dissolution under N2." *Environmental Science and Technology* 38(4): 1031-1037.

Foster, A. L., G. E. Brown and G. A. Parks (1998a). "X-ray absorption fine-structure spectroscopy study of photocatalyzed, heterogeneous As (III) oxidation on kaolin and anatase." *Environmental Science & Technology* 32(10): 1444-1452.

Foster, A. L., G. E. Brown and G. A. Parks (2003). "X-ray absorption fine structure study of As(V) and Se(IV) sorption complexes on hydrous Mn oxides." *Geochimica Et Cosmochimica Acta* 67(11): 1937-1953.

Foster, A. L., G. E. Brown, T. N. Tingle and G. A. Parks (1998b). "Quantitative arsenic speciation in mine tailings using X-ray absorption spectroscopy." *American Mineralogist* 83(5-6): 553-568.

Francesconi, K. A. and D. Kuehnelt (2004). "Determination of arsenic species: A critical review of methods and applications, 2000-2003." *Analyst* 129(5): 373-395.

Gallagher, P. A., C. A. Schwegel, X. Y. Wei and J. T. Creed (2001). "Speciation and preservation of inorganic arsenic in drinking water sources using EDTA with IC separation and ICP-MS detection." *Journal of Environmental Monitoring* 3(4): 371-376.

Garcia-Manyes, S., G. Jimenez, A. Padro, R. Rubio and G. Rauret (2002). "Arsenic speciation in contaminated soils." *Talanta* 58(1): 97-109.

Garside, C. (1982). "A Chemi-Luminescent Technique for the Determination of Nanomolar Concentrations of Nitrate and Nitrite in Sea-Water." *Marine Chemistry* 11(2): 159-167.

Gong, Z., X. Lu, M. Ma, C. Watt and X. C. Le (2002a). "Arsenic speciation analysis." *Talanta* 58(1): 77-96.

Gong, Z. L., X. F. Lu, W. R. Cullen and X. C. Le (2001). "Unstable trivalent arsenic metabolites, monomethylarsonous acid and dimethylarsinous acid." *Journal of Analytical Atomic Spectrometry* 16(12): 1409-1413.

Gong, Z. L., X. F. Lu, M. S. Ma, C. Watt and X. C. Le (2002b). "Arsenic speciation analysis." *Talanta* 58(1): 77-96.

Guo, H. and Y. Wang (2005). "Geochemical characteristics of shallow groundwater in Datong basin, northwestern China." *Journal of Geochemical Exploration* 87(3): 109-120.

Harvey, C. F., C. H. Swartz, A. B. M. Badruzzaman, N. Keon-Blute, W. Yu, et al. (2005). "Groundwater arsenic contamination on the Ganges Delta: biogeochemistry, hydrology, human perturbations, and human suffering on a large scale." *Comptes Rendus Geoscience* 337(1-2): 285-296.

Hering, J. G., P. Y. Chen, J. A. Wilkie and M. Elimelech (1997). "Arsenic removal from drinking water during coagulation." *Journal of Environmental Engineering-Asce* 123(8): 800-807.

Hering, J. G., P. Y. Chen, J. A. Wilkie, M. Elimelech and S. Liang (1996). "Arsenic removal by ferric chloride." *Journal American Water Works Association* 88(4): 155-167.

Higgins, F. E., F. Goodarzi and C. J. Lafferty (1996). "Mode of occurrence of arsenic in subbituminous." *Energy & Fuel* 10: 1001-1004.

Higgins, F. E. and G. P. Huffman (1996). "Models of occurrence of trace elements in coal from XAFS spectroscopy." *International Journal of Coal Geology* 32:31-53.

Higgins, F. E., N. Shah, J. Zhao, F. Lu and G. P. Huffman (1993). "Nondestructive determination of trace element speciation in coal and coal ash by XAFS spectroscopy." *Energy & Fuel* 7:482-489.

Hodi, M., K. Polyak and J. Hlavay (1995). "Removal of pollutants from drinking water by combined ion exchange and adsorption methods." *Environment International* 21(3): 325-331.

Hong, H. K. (2006). "A new device for fluorescence x-ray absorption fine structure studies on high-temperature melts up to 1600 K." *Journal of Applied Physics* (in preparation).

Hubble, H. W., I. Kudryashov, V. L. Solozhenko, P. V. Zinin, S. K. Sharma, et al. (2004). "Raman studies of cubic BC2N, a new superhard phase." *Journal of Raman Spectroscopy* 35(10): 822-825.

Islam, F. S., A. G. Gault, C. Boothman, D. A. Polya, J. M. Charnock, et al. (2004). "Role of metal-reducing bacteria in arsenic release from Bengal delta sediments." *Nature* 430 (6995): 68-71.

Johnson, H. P., M. Hutnak, R. P. Dziak, C. G. Fox, I. Urcuyo, et al. (2000). "Earthquake-induced changes in a hydrothermal system on the Juan de Fuca mid-ocean ridge." *Nature* 407(6801): 174-177.

Johnston, R., H. Heijnen and P. Wurzel (2001). Safe Water Technology, WHO.

Kanel, S. R., B. Manning, L. Charlet and H. Choi (2005). "Removal of arsenic(III) from groundwater by nanoscale zero-valent iron." *Environmental Science & Technology* 39(5):1291-1298.

Kartinen, E. O. and C. J. Martin (1995). "An overview of arsenic removal processes." *Desalination* 103(1-2): 79-88.

Katsoyiannis, 1., A. Zouboulis, H. Althoff and H. Bartel (2002). "As(III) removal from groundwaters using fixed-bed upflow bioreactors." *Chemosphere* 47(3): 325-332.

Kenig, F., D. J. H. Simons, D. Crich, J. P. Cowen, G. T. Ventura, et al. (2002). "Alkanes with a quaternary carbon centre: a 2,200 Myr. record of sulfide oxidizing bacteria." *Geochimica Et Cosmochimica Acta* 66(15A): A393-A393.

Kenig, F., D. J. H. Simons, D. Crich, J. P. Cowen, G. T. Ventura, et al. (2005). "Structure and distribution of branched aliphatic alkanes with quaternary carbon atoms in Cenomanian and Turonian black shales of Pas quia Hills (Saskatchewan, Canada)." *Organic Geochemistry* 36(1): 117-138.

Kenig, F., D. J. H. Simons, D. Crich, J. P. Cowen, G. T. Ventura, et al. (2003). "Branched aliphatic alkanes with quaternary substituted carbon atoms in modern and ancient geologic samples." *Proceedings of the National Academy of Sciences of the United States of America* 100(22): 12554-12558.

Kim, M. J. (2001). "Separation of inorganic arsenic species in groundwater using ion exchange method." *Bulletin of Environmental Contamination and Toxicology* 67(1): 46-51.

Koundouri, P. (2005). The Economics of Arsenic Mitigation. Towards a More Effective Operational Response: Arsenic Contamination of Groundwater in South and East Asian Countries. 2: Technical Report: 210-262.

Lackovic, J. A., N. P. Nikolaidis and G. M. Dobbs (2000). "Inorganic arsenic removal by zero-valent iron." *Environmental Engineering Science* 17(1): 29-39.

Land, T. A., A. J. Malkin, Y. G. Kuznetsov, A. McPherson and J. J. Deyoreo (1995). "Mechanisms of Protein Crystal-Growth—an Atomic-Force Microscopy Study of Canavalin Crystallization." *Physical Review Letters* 75(14): 2774-2777.

Le, X. C., S. Yalcin and M. Ma (2000). "Speciation of submicrogram per liter levels of arsenic in water: On-site species separation integrated with sample collection" *Environmental Science and Technology* 34(11): 2342-2347.

Leermakers, M., W. Baeyens, M. De Gieter, B. Smedts, C. Meert, et al. (2006). "Toxic arsenic compounds in environmental samples: Speciation and validation." *Trac-Trends in Analytical Chemistry* 25(1): 1-10.

Leupin, O. X. and S. J. Hug (2005). "Oxidation and removal of arsenic (III) from aerated groundwater by filtration through sand and zero-valent iron." Water Research 39(9):1729-1740.

Lin, T.-F. and J.-K. Wu (2001). "Adsorption of Arsenite and Arsenate within Activated Alumina Grains: Equilibrium and Kinetics." Water Research 35(8): 2049-2057.

Lin, Z. and R. W. Puls (2000). "Adsorption, desorption and oxidation of arsenic affected by clay minerals and aging process." *Environmental Geology* 39(7): 753-759.

Luo, H., Y. C. Guan and K. N. Han (1998). "Corrosion inhibition of a mild steel by aniline and alkylamines in acidic solutions." Corrosion 54(9): 721-731.

Macur, R. E., C. R. Jackson, L. M. Botero, T. R. McDermott and W. P. Inskeep (2004). "Bacterial Populations Associated with the Oxidation and Reduction of Arsenic in an Unsaturated Soil." *Environmental Science and Technology* 38(1): 104-111.

Manghnani, M. H., G. Amulele, J. R. Smyth, C. M. Holl, G. Chen, et al. (2005). "Equation of state of hydrous Fo(90) ringwoodite to 45 GPa by synchrotron powder diffraction." *Mineralogical Magazine* 69(3): 317-323.

Manghnani, M. H., S. N. Tkachev, P. V. Zinin, C. Glorieoux, P. Karvankova, et al. (2005). "Elastic properties of nc-TiN/a-Si3N4 and nc-TiN/a-BN nanocomposite films by surface Brillouin scattering." Journal Of Applied Physics 97(5).

Manning, B. A., M. L. Hunt, C. Amrhein and J. A. Yarmoff (2002). "Arsenic(111) and Arsenic(V) reactions with zerovalent iron corrosion products." *Environmental Science & Technology* 36(24): 5455-5461.

Matera, V., 1. Le Hecho, A. Laboudigue, P. Thomas, S. Tellier, et al. (2003). "A methodological approach for the identification of arsenic bearing phases in polluted soils." Environmental Pollution 126(1): 51-64.

McCleskey, R. B., D. K. Nordstrom and A. S. Maest (2004). "Preservation of water samples for arsenic (III/V) determinations: an evaluation of the literature and new analytical results." *Applied Geochemistry* 19(7): 995-1009.

Melamed, D. (2005). "Monitoring arsenic in the environment: a review of science and technologies with the potential for field measurements." *Analytica Chimica Acta* 532(1):1-13.

Ming, L. C., P. Zinin, Y. Meng, X. X. Liu, S. M. Hong, et al. (2006). "A new cubic phase of $C_3N_4$ synthesized in diamond-anvil cell." *Journal of Applied Physics* 99(3): 033520.

Ming, L. C., P. V. Zinin, M. H. Manghnani, T. Carvalho, S. M. Hong, et al. (2005). "Identifying C—N Heterodiamonds with SEM, TEM and Raman Scattering." *Microscopy and Microanalysis* 11(S2): 2028-2029.

Mu, G. and X. Li (2005). "Inhibition of cold rolled steel corrosion by Tween-20 in sulfuric acid:Weight loss, electrochemical and AFM approaches." *Journal of Colloid and Interface Science* 289(1): 184-192.

Ng, J. C., J. P. Wang and A. Shraim (2003). "A global health problem caused by arsenic from natural sources." *Chemosphere* 52(9): 1353-1359.

Nikolaidis, N. P. and J. Lackovic (1998). *Presented at International Conference on Arsenic Pollution of Ground Water in Bangladesh: Causes. Effects and Remedies*. Arsenic Remediation Technology-AsRT.

Nordstrom, D. K. and F. D. Wilde (2005). Reduction-oxidation potential (electrode method). *Field Measurements*. U.S. Geological Survey TWRI Book 9.

Olivares-Xometl, O., N. V. Likhanova, M. A. Dominguez-Aguilar, J. M. Hallen, L. S. Zamudio, et al. (2006). "Surface analysis of inhibitor films formed by imidazolines and amides on mild steel in an acidic environment." *Applied Surface Science* 252(6): 2139-2152.

Oremland, R. S., S. E. Hoeft, J. A. Santini, N. Bano, R. A. Hollibaugh, et al. (2002). "Anaerobic oxidation of arsenite in Mono Lake water and by facultative, arsenite-oxidizing chemoautotroph, strain MLHE-1." *Applied and Environmental Microbiology* 68(10): 4795-4802.

Oremland, R. S, and J. F. Stolz (2003). "The ecology of arsenic." *Science* 300(5621): 939-944.

Oremland, R. S, and J. F. Stolz (2005). "Arsenic, microbes and contaminated aquifers." *Trends in Microbiology* 13(2): 45-49.

Pal, B. N. (2001). Granular Ferric Hydroxide for Elimination of Arsenic from Drinking Water. *Technologies for Arsenic Removal from Drinking Water*. M. F. Ahmed, M. A. Ali and Z. Adeel, Bangladesh University of Engineering & Technology and United Nations University: 59-68.

Phair, J. W., S, N. Tkachev, M. H. Manghnani and R. A. Livingston (2005). "Elastic and structural properties of alkaline-calcium silica hydrogels." *Journal Of Materials Research* 20(2): 344-349.

Pizarro, I., M. Gomez, C. Camara and M. A. Palacios (2003). "Arsenic speciation in environmental and biological samples—Extraction and stability studies." *Analytica Chimica Acta* 495(1-2): 85-98.

Pokrovski, G. S., J. Schott, F. Garges and J. L. Hazemann (2003). "Iron (II)-silica interactions in aqueous solution: Insights from X-ray absorption fine structure spectroscopy." *Geochimica Et Cosmochimica Acta* 67(19): 3559-3573.

Porter, K. G. and Y. S. Feig (1980). "The Use of Dapi for Identifying and Counting Aquatic Microflora." *Limnology* and Oceanography 25(5): 943-948. Pourbaix, M. (1966). *Atlas of Electrochemical Equilibria*. Oxford, Pergamon Press.

Raessler, M., B. Michalke, S. Schulte-Hostede and A. Kettrup (2000). "Long-term monitoring of arsenic and selenium species in contaminated groundwaters by HPLC and HG-AAS." *Science of the Total Environment* 258(3): 171-181.

Samanta, G. and D. A. Clifford (2005). "Preservation of inorganic arsenic species in groundwater." *Environmental Science & Technology* 39(22): 8877-8882.

Smedley, P. L. and D. G. Kinniburgh (2002). "A review of the source, behaviour and distribution of arsenic in natural waters." Applied Geochemistry 17(5): 517-568.

Smedley, P. L. and D. G. Kinniburgh. (2006). "Source and behaviour of arsenic in natural waters." from http://www.who.int/water_sanitation health/dwQ/arsenicunl.pdf.

Solozhenko, V., E. Solozhenko, P. Zinin, L. Ming, J. Chen, et al. (2003). "Equation of State and Phase Stability of Turbostratic Carbon Nitrideto." *Journal of Physics and Chemistry of Solids* 64(8): 1265-1270.

Solozhenko, V. L., N. A. Dubrovinskaia and L. Dubrovinsky (2004). "Synthesis of bulk superhard semiconducting B—C material." *Appl. Phys. Lett.* 85(8): 1-4.

Solozhenko, V. L. and A. Kurakevich (2004). "Stability of Phase Transformations of Turbostratic B—C—N Materials under High Pressure and High Temperature." *Super Hard Mater.* 4(1): 35-41.

Stumm, W. and J. J. Morgan (1970). *Aquatic Chemistry. An Introduction Emphasizing Chemical Equilibria in Natural Waters*. N.Y., Wiley.

Su, C. and R. W. Puls (2001). "Arsenate and arsenite removal by zerovalent iron: Kinetics, redox transformation, and implications for in situ groundwater remediation." *Environmental Science and Technology* 35(7): 1487-1492.

Swartz, C. H., N. K. Blute, B. Badruzzman, A. Ali, D. Brabander, et al. (2006). "Subsurface geochemistry and arsenic mobility in Bangladesh." *Geochimica et Cosmochimica Acta* (in press).

Swedlund, P. J. and J. G. Webster (1999). "Adsorption and polymerisation of silicic acid on ferrihydrite, and its effect on arsenic adsorption." *Water Research* 33(16): 3413-3422.

Tallman, D. E. and A. U. Shaikh (1980). "Redox Stability of Inorganic Arsenic(Iii) and Arsenic(V) in Aqueous-Solution." *Analytical Chemistry* 52(1): 197-199.

The World Bank (2005). Towards a More Effective Operational Response: Arsenic Contamination of Groundwater in South and East Asian Countries. Volume 1: Policy Report: 64.

Thoral, S., J Rose, J. M. Garnier, A. Van Geen, P. Refait, et al. (2005). "XAS study of iron and arsenic speciation during Fe(II) oxidation in the presence of As (III)." *Environ. Sci. Technol.* 39: 9478-9485.

Tkachev, S. N. and M. H. Manghnani (2000). Sound velocity and attenuation in stable and metastable liquid water to 1.2 GPa by Brillouin spectroscopy in *Science and Technology of High Pressure, Proceedings of the International Conference on High Pressure Science and Technology (AIRAPT-17)*. M. H. Manghnani, W. lNellis and M. F. Nicol. Hyderabad, India, Universities Press. 1: 137-140.

Tkachev, S. N., M. H. Manghnani and Q. Williams (2005a). "In situ brillouin spectroscopy of a pressure-induced apparent second-order transition in a silicate glass." *Physical Review Letters* 95(5).

Tkachev, S, N., M. H. Manghnani, Q. Williams and L. C. Ming (2003). "Compressibility of Na20-2SiO2 Liquid and Melt to 8 GPa Using Brillouin Scattering." *Eos. Trans. AGU* 54(46): V42A-0328.

Tkachev, S. N., M. H. Manghnani, Q. Williams and L. C. Ming (2005b). "Compressibility of hydrated and anhydrous Na20-2SiO(2) liquid and also glass to 8 GPa using Brillouin scattering." *Journal Of Geophysical Research—Solid Earth* 110(B7).

Tkachev, S. N., V. L. Solozhenko, P. V. Zinin, M. H. Manghnani and L. C. Ming (2003). "Elastic moduli of the superhard cubic BC2N phase by Brillouin scattering." *Physical Review B* 68(5).

Vempati, R. K. and R. H. Loeppert (1989). "Influence of structural and adsorbed Si on the transformation of synthetic ferrihydrite." *Clays and Clay Minerals* 37(3): 273-279.

Vink, B. W. (1996). "Stability relations of antimony and arsenic compounds in the light of revised and extended Eh-pH diagrams." Chemical Geology 130(1-2): 21-30.

WHO (2001). 2001 *United Nations Synthesis Report on Arsenic in Drinking Water*.

WHO (2003). (World Health Organization) Water Sanitation and Health. *Report on Intercountry Consultation, Kolkata, India,* 9-12 Dec. 2002. New Delhi, WHO Regional Office for South-East Asia.

WHO (2005). "(World Health Organization) Toward a More Operational Response Arsenic contamination in South and East Asian Countries. Technical Report No 31303."

Wickramasinghe, S. R., B. B. Han, J. Zimbron, Z. Shen and M. N. Karim (2004). "Arsenic removal by coagulation and filtration: comparison of groundwaters from the United States and Bangladesh." *Desalination* 169(3): 231-244. Wood, S. A., C. D. Tait and D. R. Janecky (2002). "A Raman spectroscopic study of arsenite and thioarsenite species in aqueous solution at 25 [deg] C." *Geochemical Transactions* 3: 31-39.

Yamamura, S., J. Bartram, M. Csanady, H. G. Gorchev and A. Redekopp. (2006). "Drinking Water Guidelines and Standards." from http://www.who.int/water_sanitation_health/dwq/arsenic3/en/.

Yost, E. C., M. I. Tejedor-Tejedor and M. A. Anderson (1990). "In situ CIR-FTIR characterization of salicylate complexes at the Goethite/Aqueous solution interface." *Environ Sci. Technol.* 24(6): 822-828.

Yu, C. H., Q. T. Cai, Z. X. Guo, Z. G. Yang and S. B. Khoo (2003). "Inductively coupled plasma mass spectrometry study of the retention behavior of arsenic species on various solid phase extraction cartridges and its application in arsenic speciation." *Spectrochimica Acta Part B—Atomic Spectroscopy* 58(7): 1335-1349.

Zeng, L. (2003). "A method for preparing silica-containing iron(III) oxide adsorbents for arsenic removal." *Water Research* 37(18): 4351-4358.

Zeng, L. (2004). "Arsenic adsorption from aqueous solutions on an Fe(III)-Si binary oxide adsorbent." *Water Quality Research Journal of Canada* 39(3): 267-275.

Zhang, F. S, and H. Itoh (2005). "Iron oxide-loaded slag for arsenic removal from aqueous system." *Chemosphere* 60(3): 319-325.

Zinin, P. V., I. Kudryashov, N. Konishi, L. C. Ming, V. L. Solozhenko, et al. (2005). "Identification of the diamond-like B—C phases by confocal Raman spectroscopy." *Spectrochimica Acta Part A: Molecular and Biological Spectroscopy* 61(10): 2386-2389.

Zinin, P. V., L. C. Ming, I. Kudryashov, N. Konishi, M. H. Manghnani, et al. (2006). "Phase transformation in the BC1.6 phase under high pressure and high temperature." *Journal of Applied Physics* (submitted).

Zinin, P. V., V. L. Solozhenko, A. J. Malkin and L. C. Ming (2005). "Atomic force microscopy studies of cubic BC2N, a new superhard phase." *Journal of Materials Science* 40(11): 3009-3011.

All patents and publications are herein incorporated by reference in their entireties to the same extent as if each individual publication was specifically and individually indicated to be incorporated by reference.

The invention illustratively described herein suitably can be practiced in the absence of any element or elements, limitation or limitations that is not specifically disclosed herein. The terms and expressions which have been employed are used as terms of description and not of limitation, and there is no intention that in the use of such terms and expressions indicates the exclusion of equivalents of the features shown and described or portions thereof. It is recognized that various modifications are possible within the scope of the invention disclosed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the disclosure.

What is claimed is:

1. A medium useful for the removal of a contaminant in a fluid, comprising iron, clay, carbon and an Iron-Silica complex coating, wherein the medium has a porosity of 75-80%.

2. The medium of claim 1, wherein the clay is kaolinite.

3. The medium of claim 1, wherein the specific surface area of the medium is about 40 $m^2/g$.

4. The medium of claim 1, wherein the total pore volume is about 0.28 cc/g.

5. The medium of claim 1, wherein the Iron-Silica coating comprises zero valent iron oxide.

6. The medium of claim 1, wherein the Iron-Silica coating forms when the medium is contacted with a fluid.

7. The medium of claim 6, wherein the fluid is water.

8. The medium of claim 1, wherein the medium is effective for removal of arsenic from water.

9. The medium of claim 1, wherein the medium is effective for removal of a heavy metal from water.

10. The medium of claim 1, wherein the medium is a granule having a diameter of 0.5-2.36 mm.

11. The medium of claim 1, wherein the medium has an adsorption capacity for As(III) of 12.5 mg/g, 19.8 mg/g, and 27.1 mg/g at pH of 4.0, 7.0 and 10, respectively.

12. The medium of claim 1, wherein the medium has an adsorption capacity for As(V) 41 mg/g, 32 mg/g and 21 mg/g at pH of 4.0, 7.0 and 10, respectively.

13. A medium for removal of a contaminant in a fluid comprising a pottery granule and an Iron-Silica complex coating, wherein the pottery granule comprises iron, clay and carbon, and wherein the medium has a porosity of 75-80%.

14. A method for producing an iron coated pottery granule (ICPG) comprising:
    obtaining a porous pottery granule by:
        mixing a clay, a carbon source material, and porosity control chemical to obtain a mixture, wherein the clay is kaolinite; and
        firing the mixture in an anoxic chamber until the porous pottery granule is formed;
    coating the pottery granule with iron powder; and
    re-firing the pottery granule.

15. A method for producing an iron coated pottery granule (ICPG) comprising:
    obtaining a porous pottery granule by:
        mixing a clay, a carbon source material, and a porosity control chemical to obtain a mixture; and
        firing the mixture in an anoxic chamber until the porous pottery granule is formed;
    coating the pottery granule with iron powder, wherein the iron powder is zero-valent iron powder; and
    re-firing the pottery granule.

16. A method for producing a porous pottery granule, comprising:
    mixing a clay, a carbon source material, and a porosity control chemical to obtain a mixture; and
    firing the mixture in an anoxic chamber at a temperature of between 590 and 630° C.

17. The method of claim 16, wherein the clay is kaolinite.

18. The method of claim 16, wherein the carbon source material is flour.

19. The method of claim 16, wherein the porosity control chemical is liquid wax.

20. A porous pottery granule obtainable by the process of claim 16.

* * * * *

UNITED STATES PATENT AND TRADEMARK OFFICE
CERTIFICATE OF CORRECTION

PATENT NO.        : 8,361,920 B2                                             Page 1 of 1
APPLICATION NO.   : 12/159604
DATED             : January 29, 2013
INVENTOR(S)       : Liangjie Dong It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 665 days.

Signed and Sealed this

First Day of September, 2015

Michelle K. Lee
*Director of the United States Patent and Trademark Office*